(12) United States Patent
Takemura

(10) Patent No.: US 9,207,125 B2
(45) Date of Patent: Dec. 8, 2015

(54) IMAGE FORMING APPARATUS

(71) Applicant: CANON KABUSHIKI KAISHA, Tokyo (JP)

(72) Inventor: Taichi Takemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 14/071,026

(22) Filed: Nov. 4, 2013

(65) Prior Publication Data

US 2014/0125982 A1    May 8, 2014

(30) Foreign Application Priority Data

Nov. 6, 2012 (JP) .................................. 2012-244531
Nov. 7, 2012 (JP) .................................. 2012-245506

(51) Int. Cl.
*G01J 3/52* (2006.01)
*G03G 15/00* (2006.01)
*G01J 3/50* (2006.01)
*B41J 29/38* (2006.01)
*H04N 1/60* (2006.01)
*G01J 3/46* (2006.01)
*G03G 15/01* (2006.01)
*H04N 1/00* (2006.01)

(52) U.S. Cl.
CPC .. *G01J 3/52* (2013.01); *B41J 29/38* (2013.01); *G01J 3/502* (2013.01); *G03G 15/5062* (2013.01); *G03G 15/55* (2013.01); *H04N 1/6033* (2013.01); *G01J 3/462* (2013.01); *G03G 15/0189* (2013.01); *G03G 2215/0129* (2013.01); *G03G 2215/0164* (2013.01); *H04N 1/00623* (2013.01)

(58) Field of Classification Search
None
See application file for complete search history.

(56) References Cited

U.S. PATENT DOCUMENTS

2008/0025777 A1*  1/2008  Nagel et al. ................... 399/396

FOREIGN PATENT DOCUMENTS

JP          2004-086013 A       3/2004

* cited by examiner

*Primary Examiner* — Clayton E Laballe
*Assistant Examiner* — Jas Sanghera
(74) *Attorney, Agent, or Firm* — Canon USA Inc. IP Division

(57) ABSTRACT

An image forming apparatus includes an image forming unit configured to form a measurement image on a sheet, a measurement unit configured to emit light to the measurement image, and measure light reflected from the measurement image, a selection unit configured to select one of a first mode for feeding a sheet, forming a measurement image on the sheet with the image forming unit, and measuring the measurement image on the sheet with the measurement unit, and a second mode for feeding a chart on which a measurement image has already been formed, and measuring the measurement image on the chart with the measurement unit without performing image formation with the image forming unit, and a control unit configured to control the measurement unit to perform measurement of the measurement image according to the mode selected by the selection unit.

19 Claims, 21 Drawing Sheets

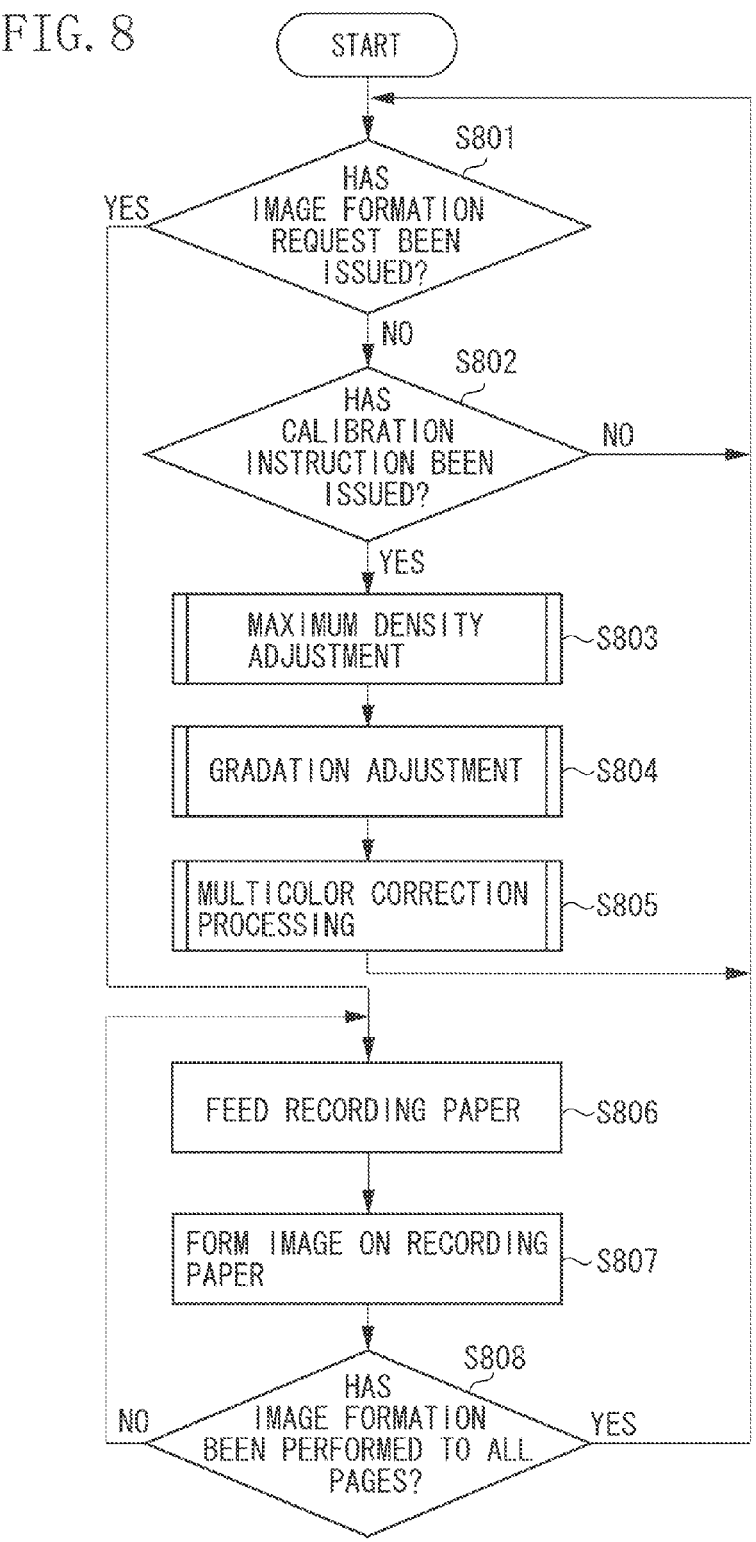

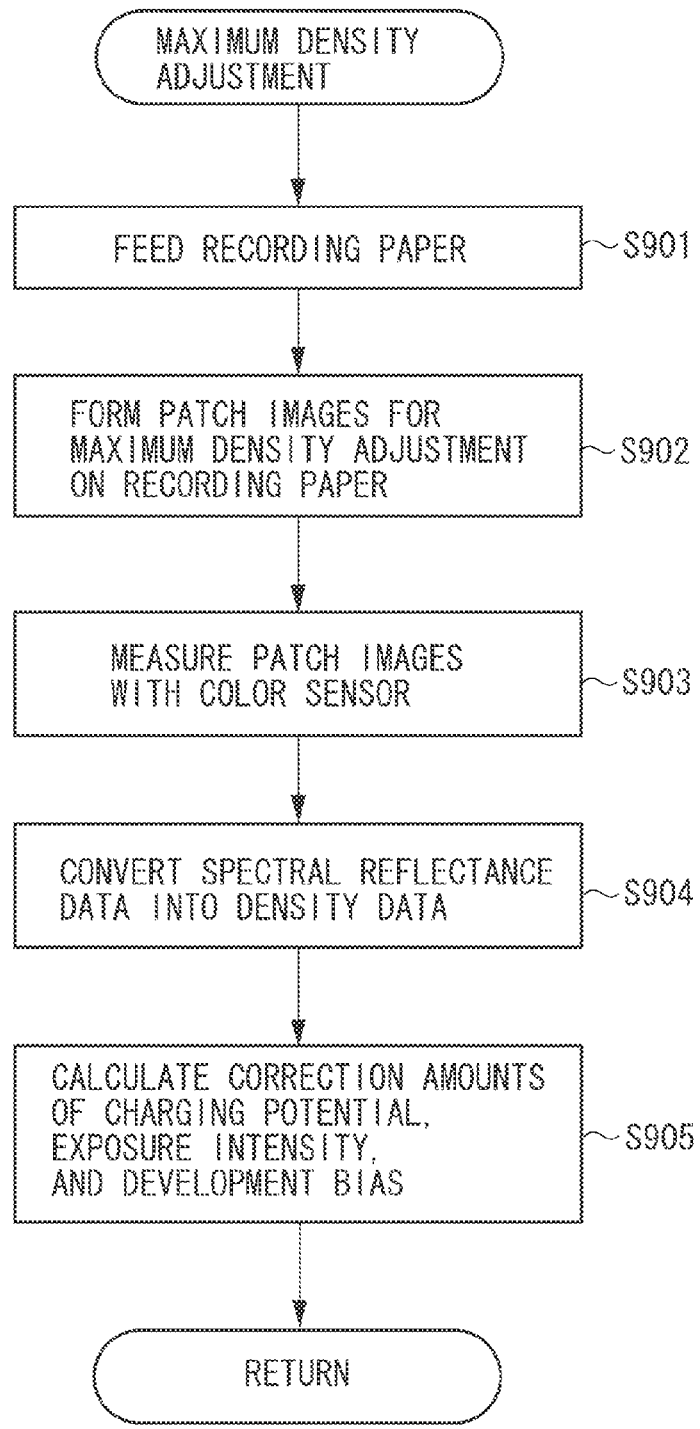

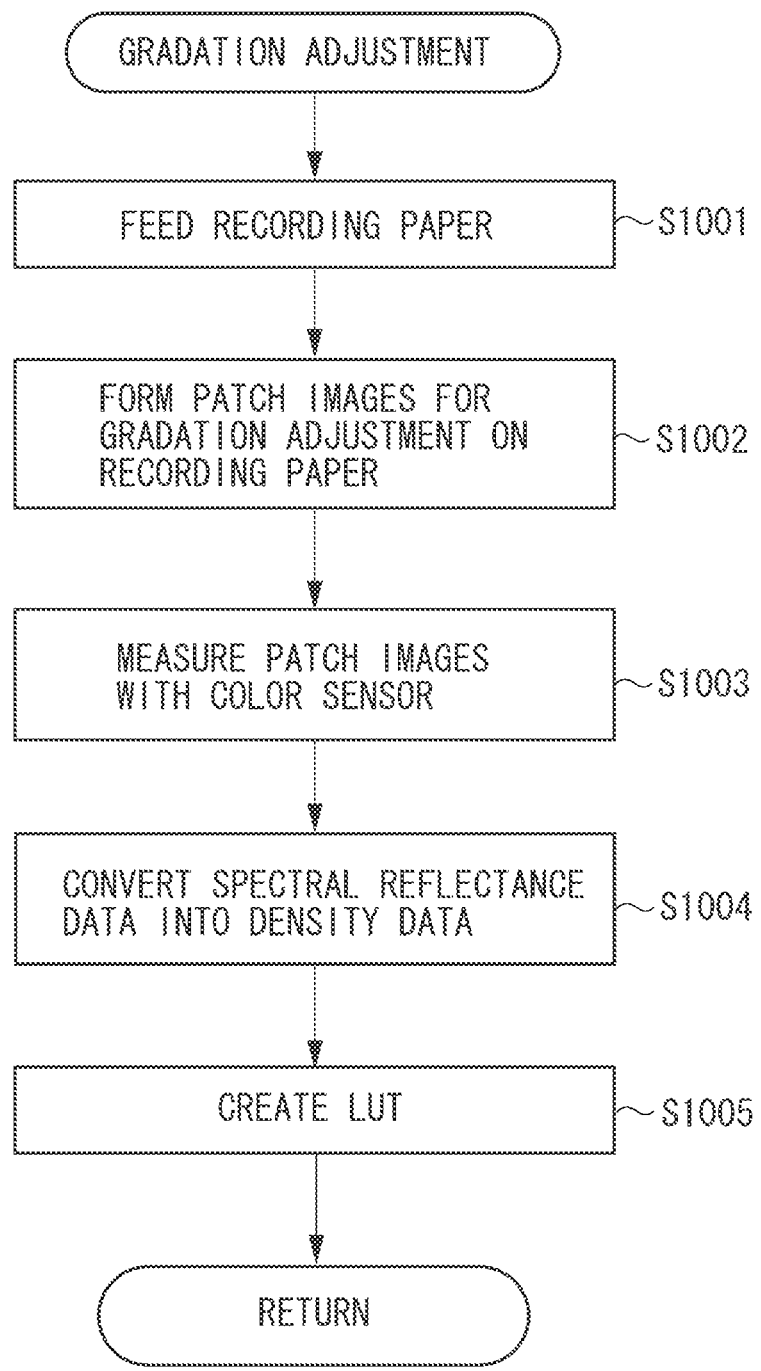

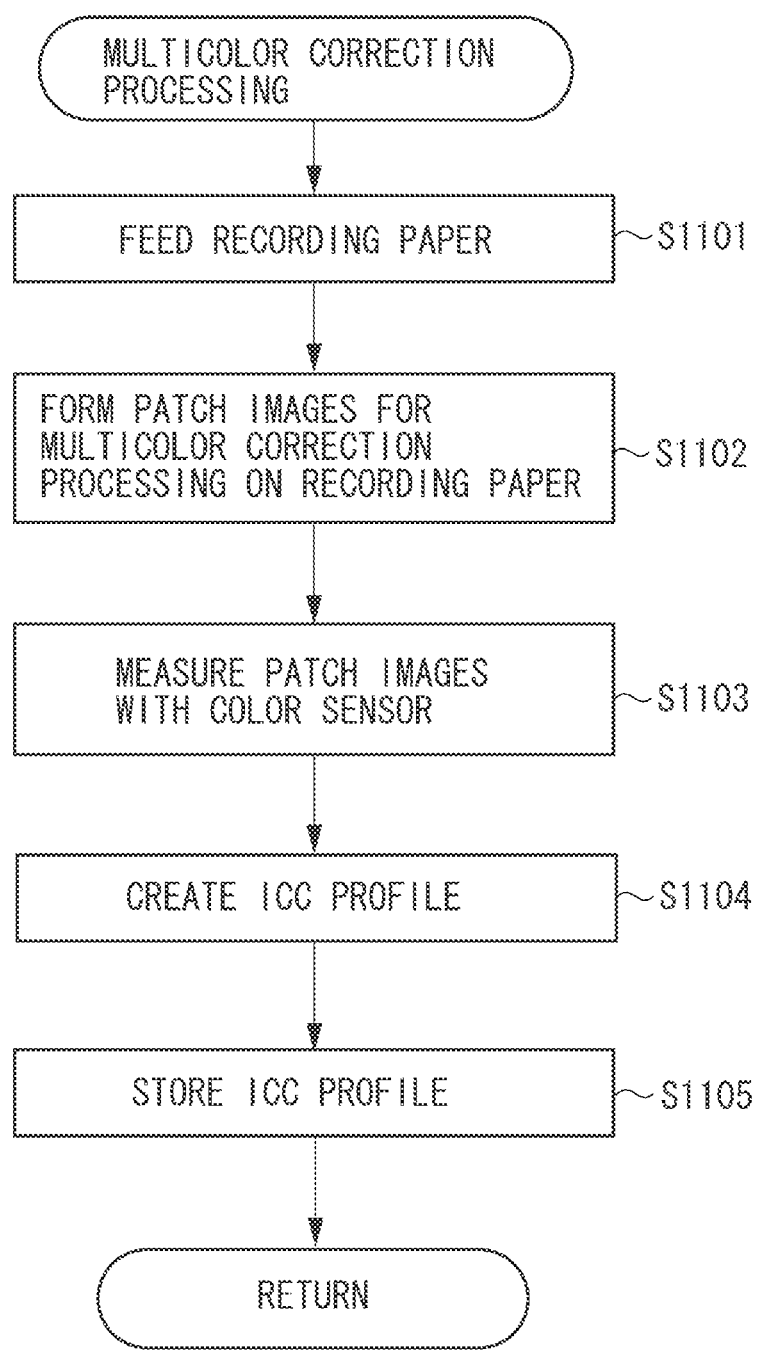

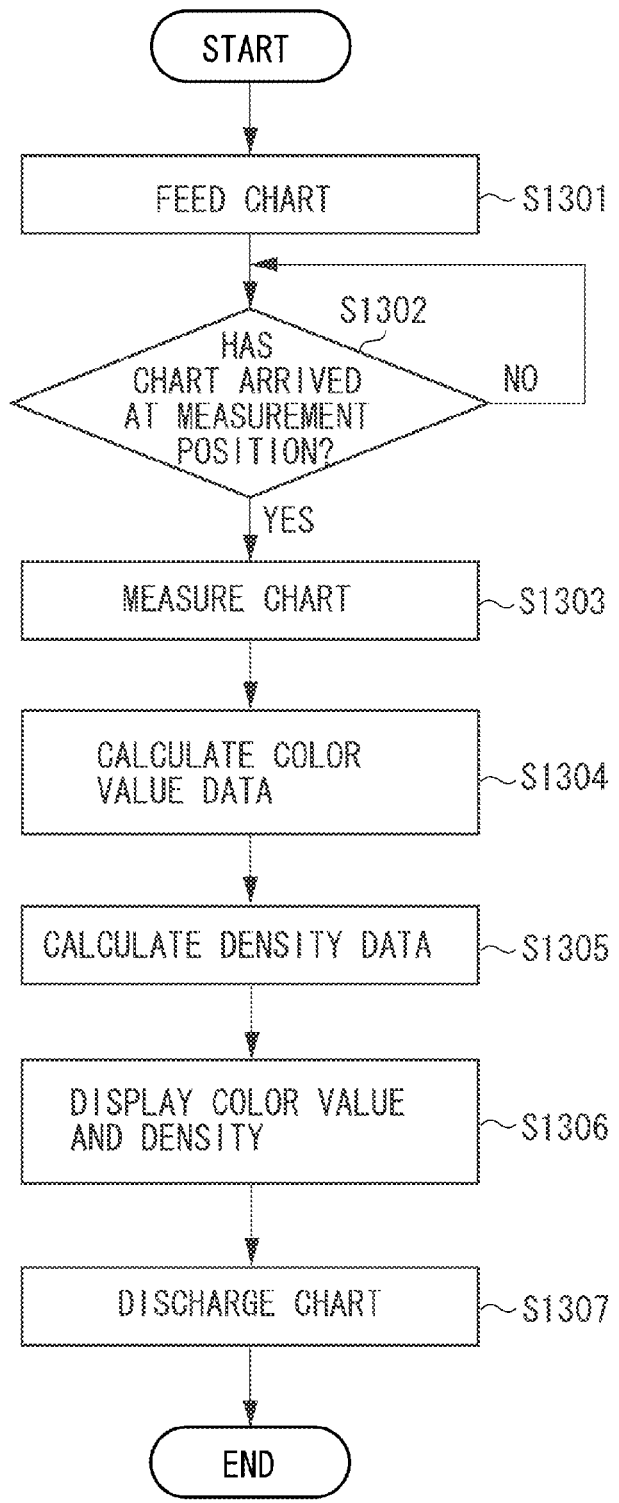

FIG. 14

MEASUREMENT RESULT

| PATCH NUMBER | L | a | b | D_C | D_M | D_Y | D_K |
|---|---|---|---|---|---|---|---|
| 1 | 60.9 | 1.2 | 1.7 | 0.536 | 0.448 | 0.515 | 0.563 |
| 2 | 91.9 | -0.5 | 0.5 | 0.094 | 0.094 | 0.093 | 0.095 |
| 3 | 33.4 | 11.9 | 10.7 | 1.085 | 0.817 | 1.149 | 1.335 |
| 4 | 42.0 | -34.5 | 32.2 | 0.942 | 1.087 | 0.718 | 1.664 |
| ⋮ | ⋮ | ⋮ | ⋮ | ⋮ | ⋮ | ⋮ | ⋮ |

OK　STORE

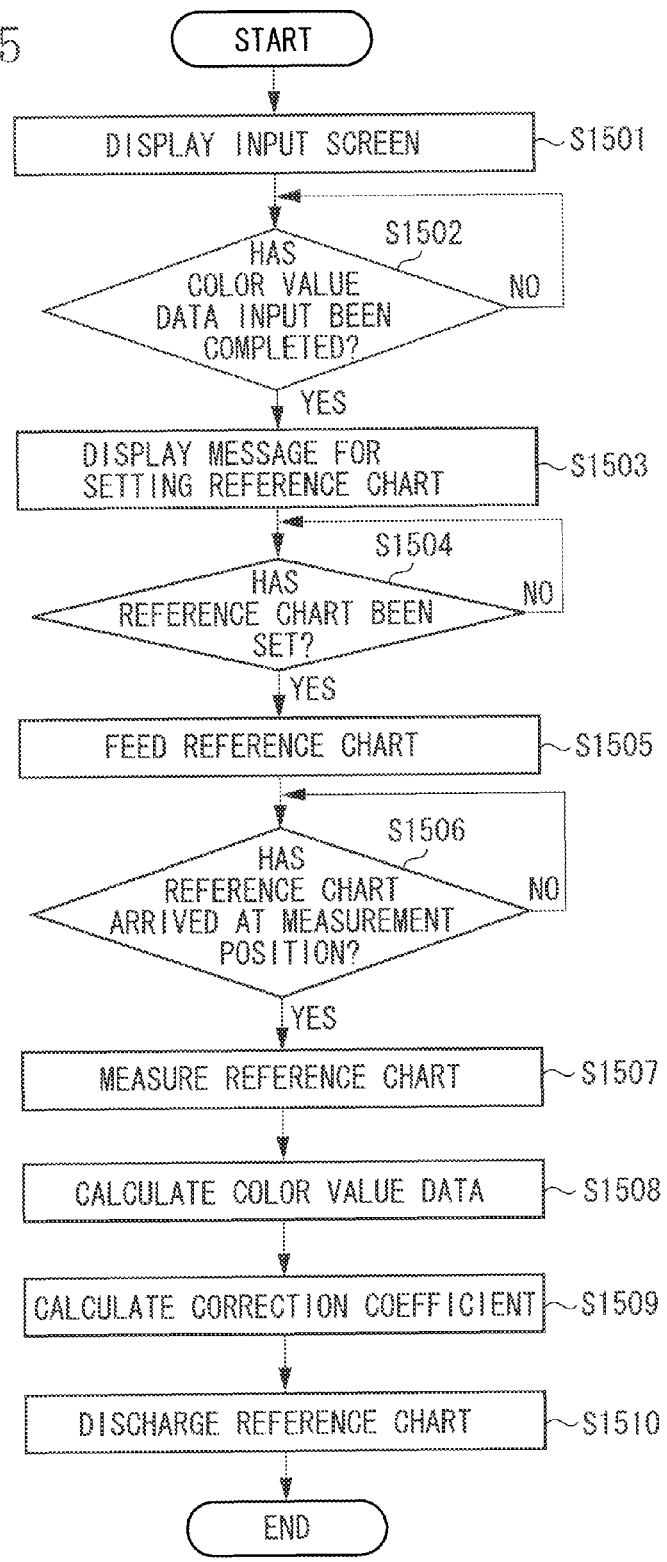

FIG. 18

| COLOR SENSOR MEASUREMENT VALUE | | | MEASUREMENT VALUE BY EXTERNAL MEASUREMENT DEVICE | | |
|---|---|---|---|---|---|
| $L^*$ | $a^*$ | $b^*$ | $L^{*'}$ | $a^{*'}$ | $b^{*'}$ |
| 18.7 | -2.0 | -2.3 | 19.8 | -1.8 | -2.5 |
| 33.8 | -1.9 | -6.2 | 34.4 | -1.9 | -6.2 |
| 52.4 | 2.1 | 1.0 | 52.8 | 2.2 | 1.0 |
| 77.4 | 0.5 | 0.6 | 77.5 | 0.4 | 0.6 |
| 94.7 | -0.1 | -2.6 | 94.8 | -0.2 | -2.4 |
| 41.9 | -56.0 | 31.1 | 42.2 | -55.6 | 30.6 |
| 40.8 | -10.6 | -35.9 | 41.2 | -10.5 | -35.9 |
| 14.7 | 39.9 | 35.4 | 41.9 | 35.5 | -9.5 |
| 66.3 | 32.9 | 11.3 | 66.5 | 33.2 | 11.5 |
| 60.3 | -31.0 | 34.5 | 60.7 | -31.2 | 34.7 |
| 34.6 | -34.0 | 6.7 | 35.2 | -33.7 | 6.7 |
| 76.5 | 12.4 | 11.6 | 76.6 | 12.6 | 11.9 |
| ... | ... | ... | ... | ... | ... |
| ... | ... | ... | ... | ... | ... |
| ... | ... | ... | ... | ... | ... |

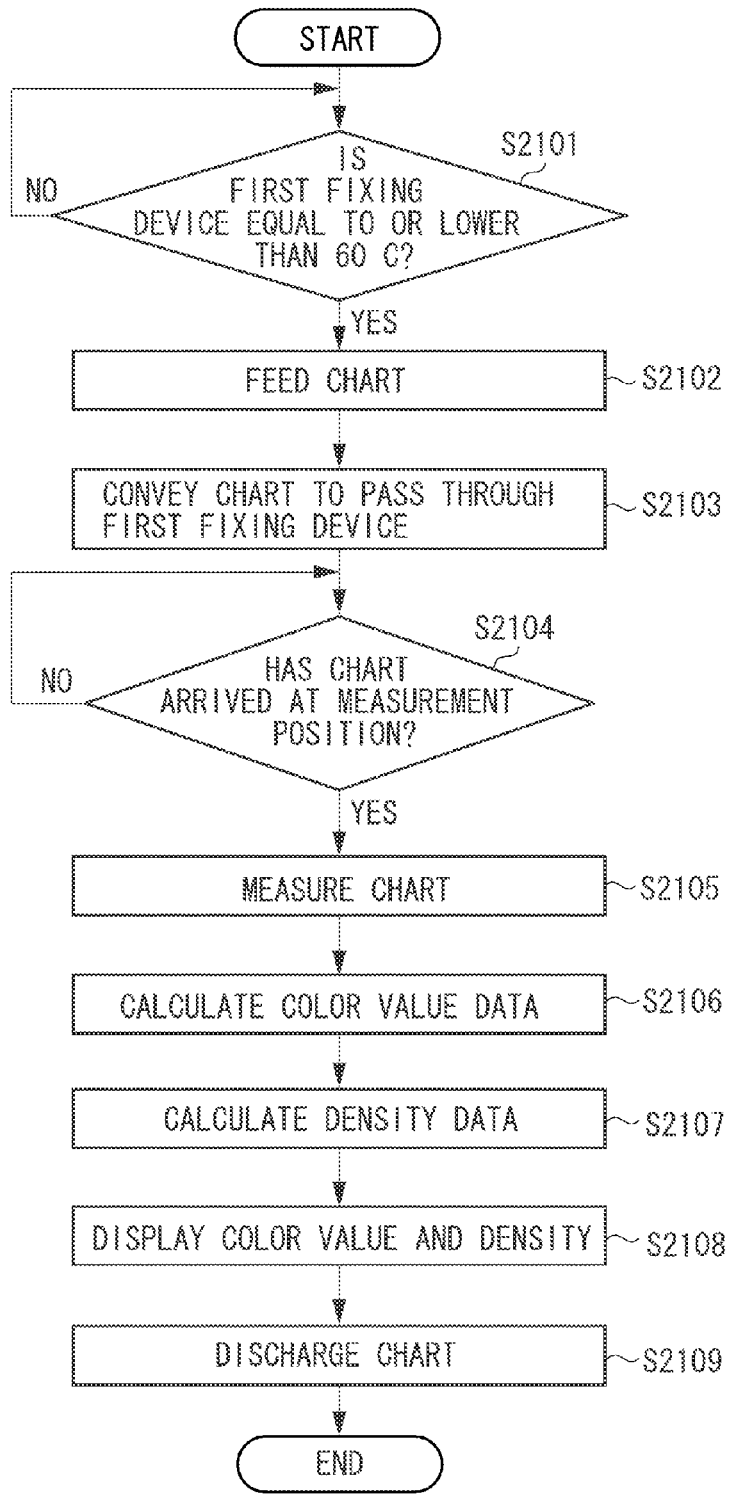

IMAGE FORMING APPARATUS

BACKGROUND OF THE INVENTION

1. Field of the Invention

The present invention relates to image forming apparatuses having a function of measuring color of a measurement image.

2. Description of the Related Art

Factors of image quality of an image forming apparatus include graininess, in-plane uniformity, character quality, and color reproduction (including color stability). Nowadays multicolor image forming apparatuses are prevalent, and color reproduction is regarded as one of the most important factors of the image quality.

A person has memories of expected colors (especially, human skin, blue sky, metal, etc.) derived from experiences and may feel uncomfortable if a color is beyond an acceptable range thereof. Such colors are called memory colors, and the reproducibility of the colors becomes an important factor in outputting pictures, and the like.

In addition to the photo images, also in reproducing document images, the degree of demand for the color reproducibility (including stability) to the image forming apparatuses is growing among office users who feel uncomfortable with differences of the document image colors from colors on monitors, and graphic art users who pursue color reproducibility in CG images.

In order to fulfill such users' demands for color reproducibility, an image forming apparatus is proposed which reads a measurement image (patch image) formed on a sheet with a color sensor provided on a conveyance path of the sheet (for example, see Japanese Patent Application Laid-Open No. 2004-086013).

In the image forming apparatus, measurement images are formed on a sheet, and based on a result of the patch images read by the color sensor, feedback on process conditions such as exposure amounts and developing bias is carried out. This enables reproduction at a certain density, a certain gradation, and a certain tint.

The arrangement of the color sensor for the use as the in-line sensor in the image forming apparatus, however, causes variations in the measurement values due to various factors such as attachment accuracy in attaching the sensor to the apparatus, the environment within the apparatus, and change with time. Especially, in a case where a plurality of color sensors are provided in the image forming apparatus, measurement value variations among the sensors cause difficulty in high-accuracy matching and in maintaining color stability.

Further, in a case where there are no variations in the measurement values of the color sensors arranged in the image forming apparatus, there may be differences in the measurement values among the image forming apparatuses having sensors of the same type, and this may cause tint differences among the apparatuses.

Consequently, it is necessary to check how much the measurement values of the color sensors vary to correct the measurement value variations. For the correction, it is required to measure a chart as a reference with a color sensor to calculate variations in the measurement values, and to calculate a correction value for reducing the variations in the measurement values.

SUMMARY OF THE INVENTION

The present invention is directed to providing an image forming apparatus having a mode for reducing variations in measurement values of a measurement unit to increase convenience and to increase the stability in tint of output products.

According to an aspect of the present invention, an image forming apparatus includes an image forming unit configured to form a measurement image on a sheet, a measurement unit configured to emit light to the measurement image, and measure light reflected from the measurement image, a selection unit configured to select one of a first mode for feeding a sheet, forming a measurement image on the sheet with the image forming unit, and measuring the measurement image on the sheet with the measurement unit, and a second mode for feeding a chart on which a measurement image has already been formed, and measuring the measurement image on the chart with the measurement unit without performing image formation with the image forming unit, and a control unit configured to control the measurement unit to perform measurement of the measurement image according to the mode selected by the selection unit.

According to another aspect of the present invention, an image forming apparatus includes an image forming unit configured to form a measurement image on a sheet, a fixing unit configured to heat and fix the measurement image formed on the sheet by the image forming unit, a measurement unit configured to emit light to a measurement image, and measure a light amount reflected from the measurement image in each wavelength, a selection unit configured to select one of a first mode for forming a measurement image on the sheet with the image forming unit, conveying the sheet to pass through the fixing unit, and measuring the measurement image on the sheet with the measurement unit, and a second mode for feeding a sheet on which a measurement image has already been formed, conveying the sheet to pass through the fixing unit without performing image formation with the image forming unit, and measuring the measurement image on the sheet with the measurement unit, and a control unit configured to reduce a temperature of the fixing unit when the second mode has been selected, to a temperature to be lower than a temperature when the first mode has been selected by the selection unit, and to measure the measurement image on the sheet with the measurement unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating an operation of the image forming apparatus.

FIG. 9 is a flowchart illustrating an operation in maximum density adjustment.

FIG. 10 is a flowchart illustrating an operation in gradation adjustment.

FIG. 11 is a flowchart illustrating an operation in multicolor correction processing.

FIG. 13 is a flowchart illustrating processing to be performed in the color measurement mode.

FIG. 14 illustrates a screen indicating a measurement result of a color sensor.

FIG. 15 is a flowchart illustrating processing to be performed in the sensor adjustment mode.

FIG. 18 illustrates a direct mapping table.

FIG. 21 is a flowchart illustrating processing according to the third exemplary embodiment.

DESCRIPTION OF THE EMBODIMENTS

Various exemplary embodiments, features, and aspects of the invention will be described in detail below with reference to the drawings.

(Image Forming Apparatus)

In the first exemplary embodiment, solutions for the abovementioned problems are described using an electrophotographic laser beam printer. As an exemplary image formation method, an electrophotographic method is employed. Note that the exemplary embodiment of the present invention can also be applied to an inkjet method or a sublimation method.

Figure 1:
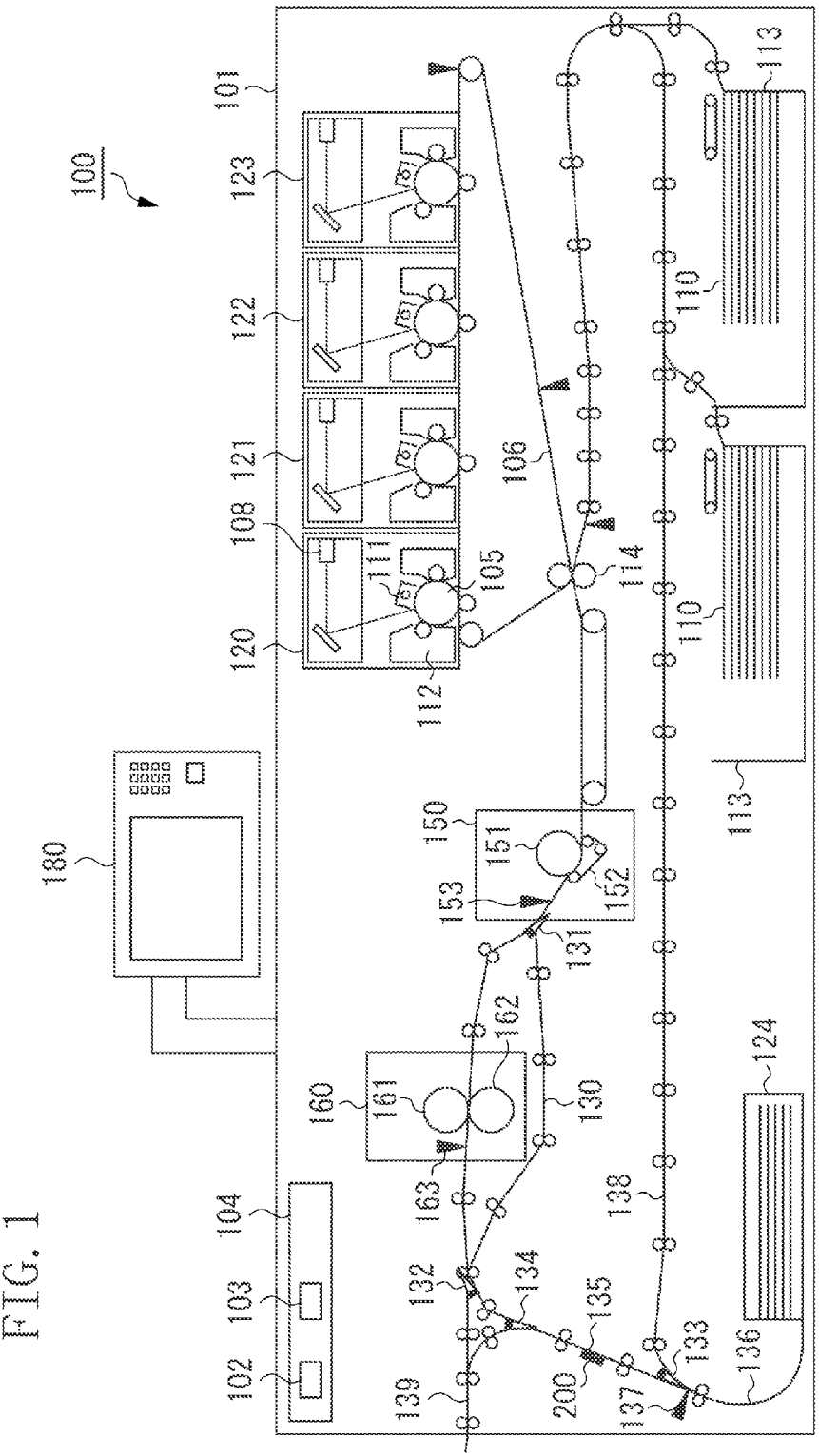
FIG. 1 is a cross-sectional view illustrating a structure of an image forming apparatus.

FIG. 1 is a cross-sectional view illustrating a configuration of an image forming apparatus 100. The image forming apparatus 100 includes a housing 101. The housing 101 includes mechanisms constituting an engine unit, and a control board storage unit 104. The control board storage unit 104 stores an engine control unit 102 for performing control relating to individual print process processing (for example, paper feed processing) by the mechanisms, and a printer controller 103.

As illustrated in FIG. 1, the engine unit includes four stations 120, 121, 122, and 123 respectively corresponding to YMCK. The stations 120, 121, 122, and 123 each serve as an image formation unit for transferring a toner onto a sheet 110 to form an image. YMCA is an abbreviation of yellow, magenta, cyan, and black. Each station has substantially common components. A photosensitive drum 105 is a kind of image carriers, and its surface is charged at a uniform potential by a primary charger 111. On the photosensitive drum 105, a latent image is formed by a laser beam emitted from a laser 108. A development unit 112 develops the latent image with a color material (toner) to form a toner image. The toner image (visible image) is transferred onto an intermediate transfer member 106. The visible image formed on the intermediate transfer member 106 is transferred onto a sheet 110 conveyed from a storage 113 by transfer rollers 114.

The fixing processing mechanism according to the exemplary embodiment includes a first fixing unit 150 and a second fixing unit 160 for heating and pressing the toner image transferred onto the sheet 110 to fix it onto the sheet 110. The first fixing unit 150 includes a fixing roller 151 for applying heat to the sheet 110, a pressure belt 152 for pressing the sheet 110 to bring into contact with a fixing roller 151, and a first post fixing sensor 153 for detecting completion of fixing. The fixing roller 151 is a hollow roller, and includes a heater inside the roller.

The second fixing unit 160 is disposed at the downstream side of the first fixing unit 150 in the conveyance direction of the sheet 110. The second fixing unit 160 imparts glossiness to the toner image fixed on the sheet 110 by the first fixing unit 150, and ensures fixation. The second fixing unit 160 includes, similarly to the first fixing unit 150, a fixation roller 161, a pressure roller 162, and a second post fixing sensor 163. Depending on the types of the sheet 110, it is not necessary to pass the sheet 110 through the second fixing unit 160. In this case, to reduce energy consumption, the sheet 110 passes through a conveyance path 130 without passing through the second fixing unit 160.

For example, in a case where a setting has been made to impart a lot of glossiness onto the sheet 110, or in a case where the sheet 110 is thick paper and requires a lot of heat for fixation, the sheet 110 that has been conveyed through the first fixing unit 150 is further conveyed to the second fixing unit 160. Meanwhile, in a case where the sheet 110 is plain paper or thin paper, and a setting has not been made to impart a lot of glossiness, the sheet 110 is conveyed to the conveyance path 130 for detouring around the second fixing unit 160. A switching member 131 controls whether to convey the sheet 110 to the second fixing unit 160 or to convey and detour the sheet 110 around the second fixing unit 160.

A switching member 132 switches conveyance paths to guide the sheet 110 to a conveyance path 135 or to a conveyance path 139 toward the outside. The leading edge of the sheet 110 guided to the conveyance path 135 passes through a reverse sensor 137, and is conveyed to a reversing unit 136. When the trailing edge of the sheet 110 is detected by the reverse sensor 137, the conveyance direction of the sheet 110 is switched. A switching member 133 switches conveyance paths to guide the sheet 110 to a conveyance path 138 for two-sided image formation or to the conveyance path 135.

In the conveyance path 135, a color sensor 200 for detecting a measurement image (hereinafter, referred to as a patch image) on the sheet 110 is disposed. The color sensor 200 includes four sensors 200a to 200d aligned in the direction perpendicular to the conveyance direction of the sheet 110 to detect patch images of four lines. In response to an instruction for measurement from an operation unit 180, the engine control unit 102 performs maximum density adjustment, gradation adjustment, multicolor correction processing, and the like. In the density adjustment and the gradation adjustment, a density of a monochromatic measurement image is measured, and in the multicolor correction processing, a color of a measurement image formed by layering a plurality of colors are measured.

The switching member 134 is a guiding member for guiding the sheet 110 to the conveyance path 139 toward the outside. The sheet 110 conveyed on the conveyance path 139 is discharged to the outside of the image forming apparatus 100.

A cassette 124 is used in measuring a sheet having patch images formed in the image forming apparatus 100, or a sheet having patch images formed in another image forming apparatus, with the color sensor 200 without passing through the fixing units. In response to a measurement instruction from the operation unit 180, the sheet set in the cassette 124 is guided to a conveyance path 136, and conveyed to the measurement position where the color sensor 200 is disposed. The measurement of the patch images on the sheet is performed by the color sensor 200, and the sheet is conveyed from the conveyance path 135 to the conveyance path 139 toward the outside of the apparatus.

(Color Sensor)

Figure 2:
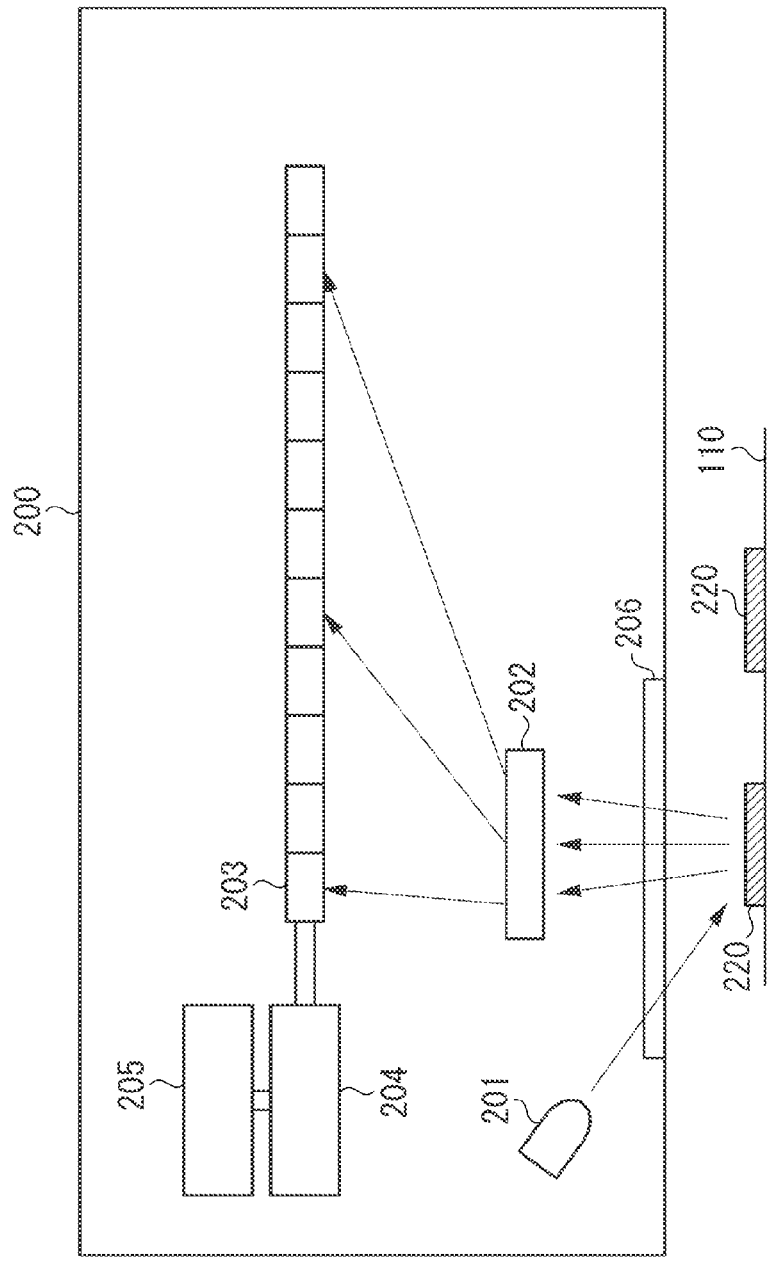
FIG. 2 illustrates a color sensor.

FIG. 2 illustrates a configuration of the color sensor 200. Within the color sensor 200, a white light-emitting diode (LED) 201, a diffraction grating 202, a line sensor 203, a calculation unit 204, and a memory 205 are provided. The white LED 201 is a light emitting element for emitting light toward a patch image 220 on the sheet 110. The light reflected from the patch image 220 passes through a window 206 made of a transparent member.

The diffraction grating 202 separates the light reflected from the patch image 220 into different wavelengths. The line sensor 203 serves as a light detection element having n pieces of right reception elements for detecting the light separated into the different wavelengths by the diffraction grating 202. The calculation unit 204 performs various calculations based on the light intensity values of the pixels detected by the line sensor 203.

The memory 205 stores various types of data to be used by the calculation unit 204. The calculation unit 204 includes, for example, a spectrum calculation unit for calculating a spectral reflectance from a light intensity value. A lens for collecting light emitted from the white LED 201 to the patch image 220 on the sheet 110, or for collecting light reflected from the parch image 220 to the diffraction grating 202 can be further provided.

Figure 3:
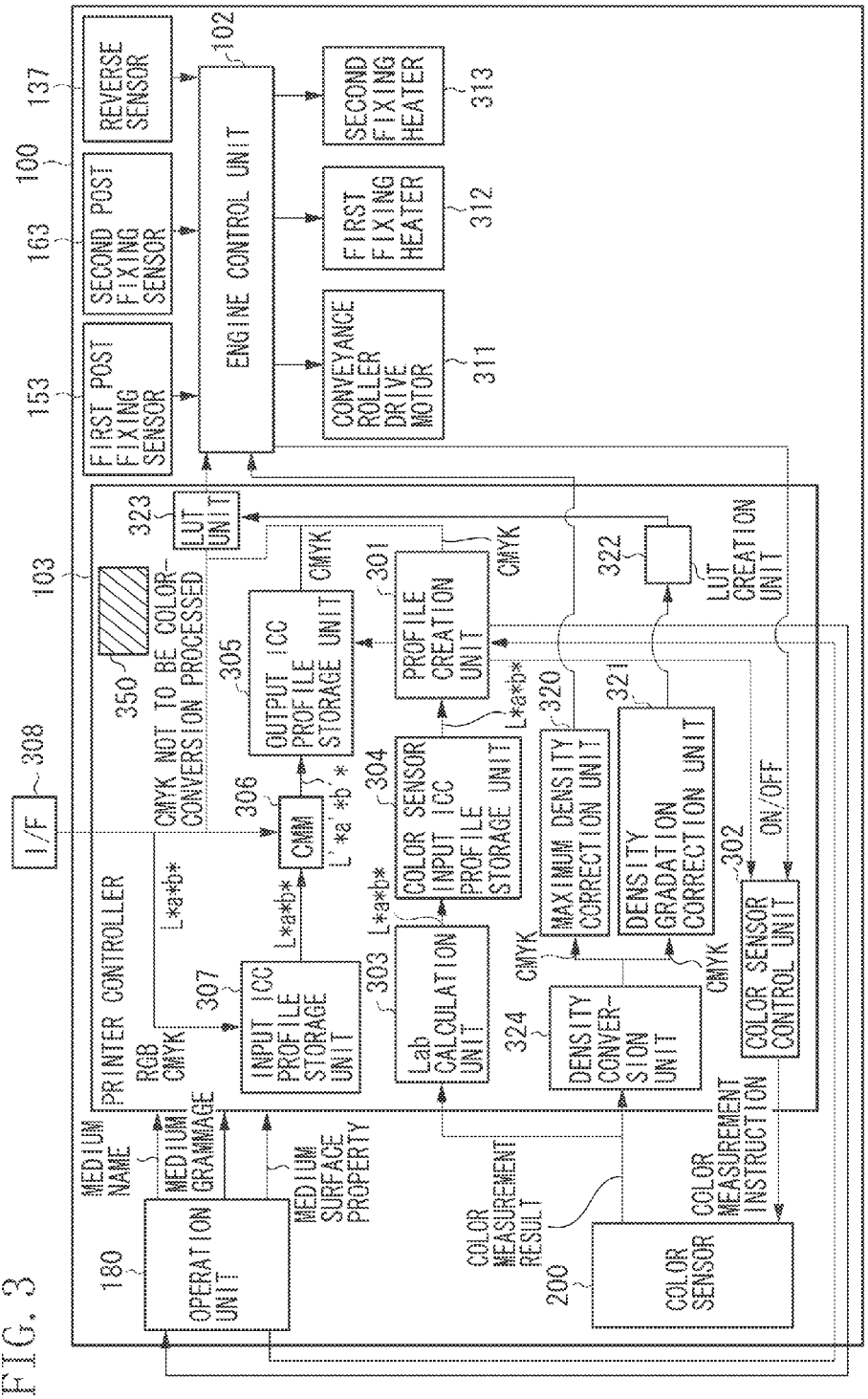
FIG. 3 is a block diagram illustrating a system configuration of the image processing apparatus.

FIG. 3 is a block diagram illustrating a system configuration of the image forming apparatus 100. With reference to the drawing, the maximum density adjustment, the gradation adjustment, and the multicolor correction processing are described. In FIG. 3, to facilitate the understanding of the processing performed by the printer controller 103, the components in the printer controller 103 are illustrated as blocks.

(Maximum Density Adjustment)

First, the printer controller 103 issues, to the engine control unit 102, an instruction to output a test chart to be used for the maximum density adjustment. In this processing, with a charging potential, exposure intensity, and developing bias, which are predetermined or set previously to the maximum density adjustment, patch images for the maximum density adjustment are formed for each color of CMYK on the sheet 110. Then, the engine control unit 102 issues, to a color sensor control unit 302, an instruction for measuring the patch images.

The color sensor 200 performs the patch image measurement, and sends the measurement result to a density conversion unit 324 as spectral reflectance data. The density conversion unit 324 converts the spectral reflectance data into density data of CMYK, and sends the converted density data to a maximum density correction unit 320.

The maximum density correction unit 320 calculates a correction amount for each of the charging potential, the exposure intensity, and the developing bias so that a density of an output toner image of image data having a maximum density becomes a desired value, and transmits the calculated correction amounts to the engine control unit 102. The engine control unit 102, in next image formation operation and after the next operation, uses the transmitted correction amounts of the charging potential, the exposure intensity, and the developing bias. By the above-described operation, the maximum density of the image to be output can be adjusted.

(Gradation Adjustment)

When the maximum density adjustment processing is completed, the printer controller 103 issues, to the engine control unit 102, an instruction to start formation of patch images of 16 gray levels on the sheet 110. The image signal of the patch images of the 16 gray levels includes, for example, 00H, 10H, 20H, 30H, 40H, 50H, 60H, 70H, 80H, 90H, A0H, B0H, C0H, D0H, E0H, and FFH.

At this stage, by using the correction amounts of the charging potential, the exposure intensity, and the developing bias calculated in the maximum density adjustment, the patch images of 16 levels are formed for each color of CMYK on the sheet 110. When the patch images of 16 levels are formed on the sheet 110, the engine control unit 102 issues, to the color sensor control unit 302, an instruction for measuring the patch images.

The color sensor 200 performs the patch image measurement, and sends the measurement result to a density conversion unit 324 as spectral reflectance data. The density conversion unit 324 converts the spectral reflectance data into density data of CMYK, and sends the converted density data to a density gradation correction unit 321. The density gradation correction unit 321 calculates a correction amount of the exposure amount to acquire desired gradation. A look-up table (LUT) creation unit 322 creates a monochrome gradation LUT, and sends it as a signal value of each color of CMYK to a LUT unit 323.

(Profile)

In performing the multicolor adjustment processing, the image forming apparatus 100 generates an International Color Consortium (ICC) profile, which will be described below, from a detection result of patch images including multiple colors, and by using the profile, converts an input image to form an output image.

Figure 4:
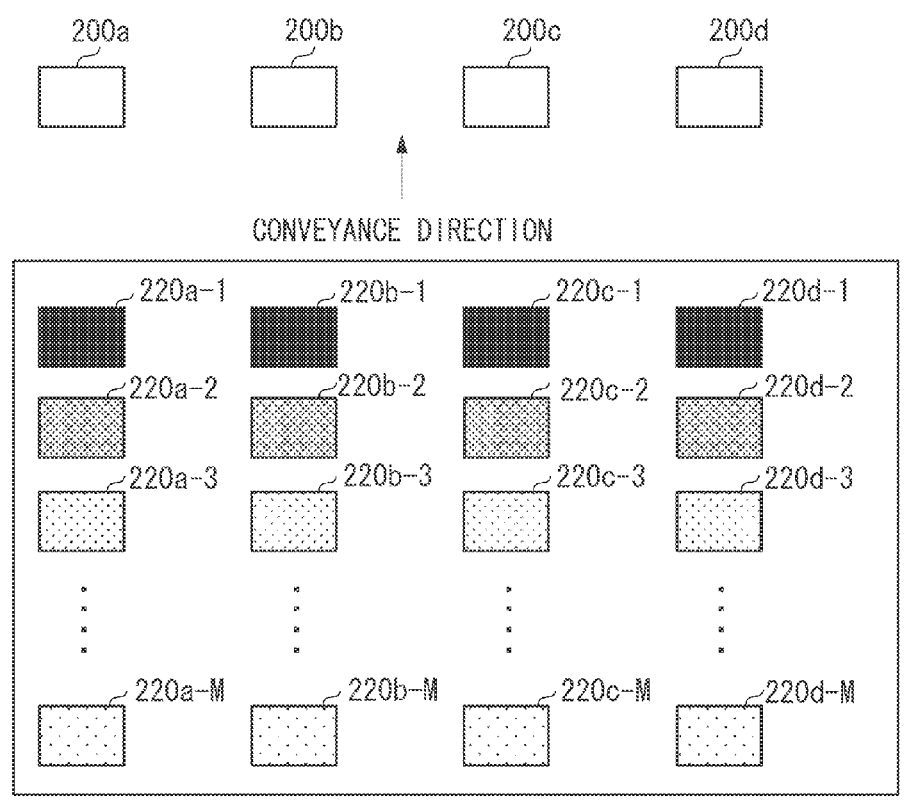
FIG. 4 illustrates an image diagram of a color measurement chart.

Halftone dot area ratios of the patch images 220 including multiple colors are varied in three steps (0%, 50%, and 100%) with respect to four colors of CMYK respectively. Then, patch images of all combinations of the halftone dot area ratio of each color are formed. As illustrated in FIG. 4, the patch images 220a to 220d of four lines are formed on the sheet to be read by each color sensor 200a to 200d. The patch images 220a to 220d include images from the first patch images (220a-1, 220b-1, 220c-1, and 220d-1) to the M-th patch images (220a-M, 220b-M, 220c-M, and 220d-M).

As the profile for realizing fine color reproduction, in this exemplary embodiment, the ICC profile format prevalent in today's marketplace is used. Note that the present invention can also be realized by profiles other than the ICC profiles. For example, the exemplary embodiment of the present invention can be applied to a Color Rendering Dictionary (CRD) employed since the Adobe's Level 2 PostScript supported by Adobe Systems Inc., or to a color separation table of Photoshop (registered trademark).

A user operates an operation unit 180 to instruct color profile creation processing when a customer engineer replaces parts, before a job which requires a high color matching accuracy is performed, or when the user wants to check tint of a final output product in a design planning stage.

The profile generation processing is performed in a printer controller 103 illustrated in the block diagram in FIG. 3. The printer controller 103 includes a central processing unit (CPU), and reads a program for implementing a flowchart, which will be described below, from a storage unit 350 and implements the program.

Upon reception of a profile creation instruction in the operation unit 180, a profile creation unit 301 outputs a CMYK color chart 210 that is an ISO 12642 test form to the engine control unit 102 without using the profile. The profile creation unit 301 sends a measurement instruction to the color sensor control unit 302. The engine control unit 102 controls the image forming apparatus 100 to perform processes such as charging, exposure, development, transfer, and fixing. Through the processing, the ISO 12642 test form is generated on the sheet 110. The color sensor control unit 302 controls the color sensor 200 to measure the ISO 12642 test form. The color sensor 200 outputs spectral reflectance data that is a measurement result to a Lab calculation unit 303 in the printer controller 103. The Lab calculation unit 303 converts the spectral reflectance data into color value data (L*a*b* data), and outputs the data to the profile creation unit 301. The L*a*b* data output from the Lab calculation unit 303 is converted using an input ICC profile for color sensor stored in a color sensor input ICC profile storage unit 304. Alternatively, the Lab calculation unit 303 can convert the spectral reflectance data into the Commission Internationale de l'Éclairage (CIE) 1931 XYZ color space that is a device independent color space signal.

The profile creation unit 301 generates an output ICC profile based on a relationship between the CMYK color signal output to the engine control unit 102 and the L*a*b* data converted by using the color sensor input ICC profile. The profile generation unit 301 stores the created output ICC profile in an output ICC profile storage unit 305.

The ISO 12642 test form includes a patch for a CMYK color signal covering a color reproduction range that can be output by a general copying machine. Consequently, the profile generation unit 301 creates a color conversion table based on the relationship between each color signal value and the measured L*a*b* value. In other words, a conversion table for converting from CMYK to Lab is created. Based on the conversion table, a reverse conversion table is generated.

The profile generation unit 301 receives a profile creation instruction from a host computer via an interface (I/F) 308, and outputs the created output ICC profile via the I/F 308. The host computer can perform color conversion corresponding to the ICC profile using an application program.

A first fixing heater is provided in the first fixing unit 150. A second fixing heater is provided in the second fixing unit 160. These heaters are controlled by the engine control unit 102. The engine control unit 102 also controls a conveyance roller drive motor 311 for driving various conveyance rollers within the image forming apparatus 100.

(Color Conversion Processing)

In color conversion of normal color output, an image signal input assuming a standard print CMYK signal value such as Japan Color or an RGB signal value input from a scanner unit via the I/F 308 is sent to an input ICC profile storage unit 307 for input from the outside. The input ICC profile storage unit 307, depending on the image signal input from the I/F 308, performs a conversion from RGB to Lab or a conversion from CMYK to Lab. The input ICC profile stored in the input ICC profile storage unit 307 includes a plurality of LUTs.

These LUTs are, for example, a one-dimensional LUT for controlling gamma correction of an input signal, a multicolor LUT called direct mapping, and a one-dimensional LUT for controlling gamma correction of created conversion data. The input image signal is converted from a device-dependent color space into device-independent L*a*b* data by using these LUTs.

The image signal converted into L*a*b* coordinates is input into a CMM 306. The term "CMM" is an abbreviation of color management module. The CMM 306 performs various kinds of color conversion. For example, the CMM 306 performs GAMUT conversion for mapping mismatch between a read color space of a scanner unit serving as an input device and an output color reproduction range of the image forming apparatus 100 serving as an output device. The CMM 306 also performs color conversion for adjusting mismatch (also called mismatch in color temperature setting) between a light source type at the time of input and a light source type used when an output product is observed.

Through the processing, the CMM 306 converts the L*a*b* data into L'*a'*b'* data, and outputs the L'*a'*b'* data to the output ICC profile storage unit 305. The profile created as a result of the measurement is stored in the output ICC profile storage unit 305. Accordingly, the output ICC profile storage unit 305 performs color conversion on the L'*a'*b'* data based on the newly created ICC profile to convert it into a CMYK signal that depends on an output device, and outputs the converted CMYK signal to the engine control unit 102.

Figure 5:
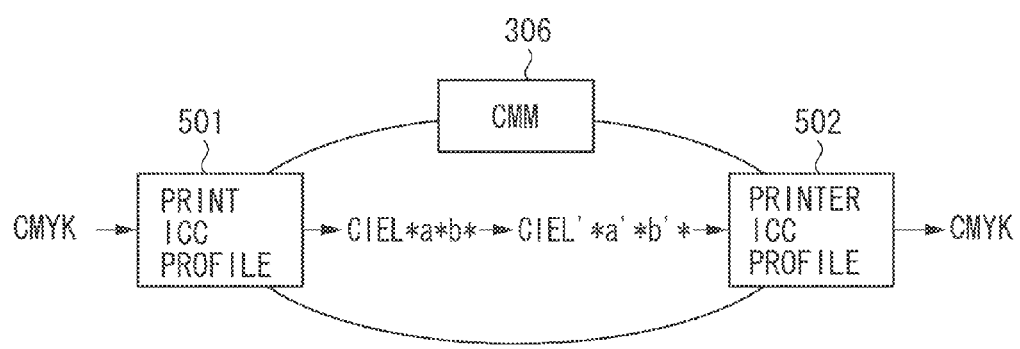
FIG. 5 illustrates a schematic configuration of a color management environment.

In FIG. 3, the CMM 306 is separated to the input ICC profile storage unit 307 and the output ICC profile storage unit 305. As illustrated in FIG. 5, however, the CMM 306 serves as a module that performs color management, and performs color conversion using an input profile (print ICC profile 501) and an output profile (printer ICC profile 502).

(Operation Unit)

Figure 6:
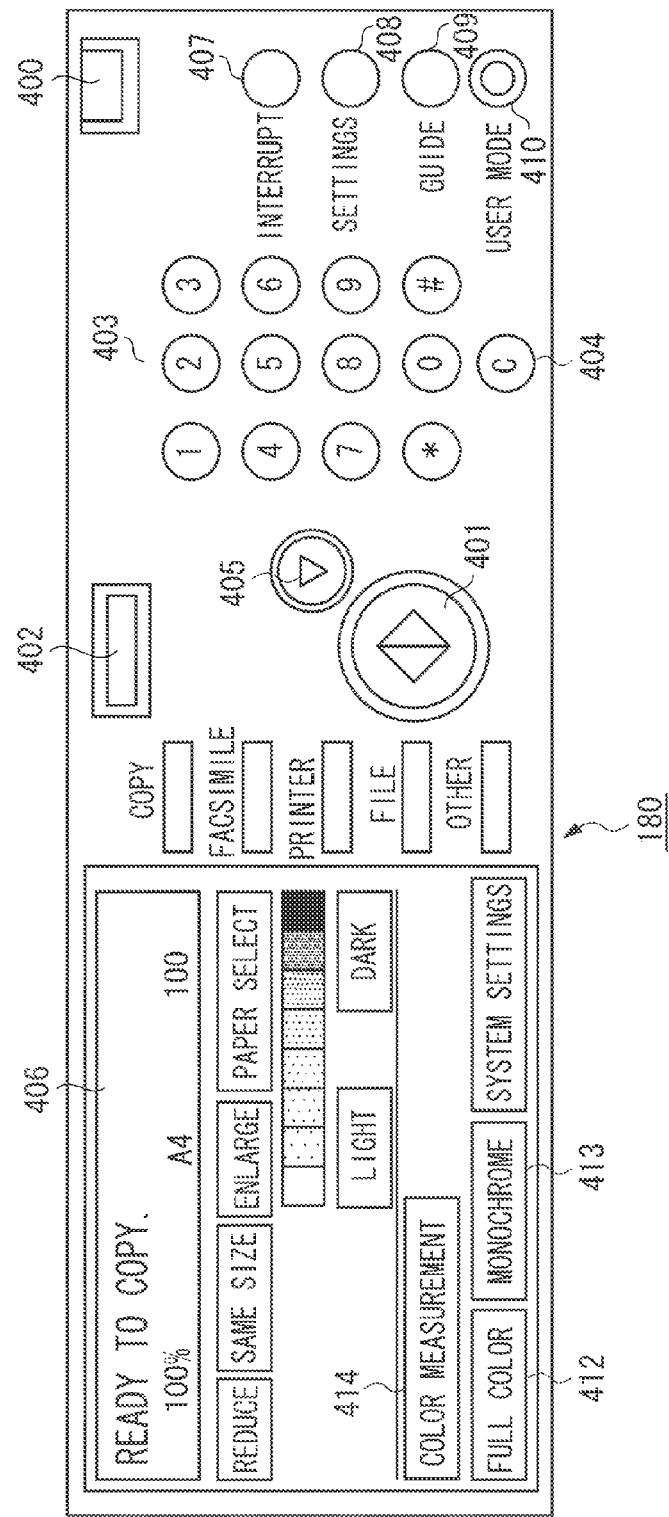
FIG. 6 illustrates an operation unit.

FIG. 6 illustrates the operation unit 180. The operation unit 180 includes a soft switch 400 for turning on and off a power source of the image forming apparatus 100, a copy start key 401 for issuing a copy start instruction, and a reset key 402 for returning to a standard mode. The standard mode is set to "full color and one-sided".

The operation unit 180 also includes a numeric keypad 403 for entering a numeric value such as the setting number of sheets, a clear key 404 for clearing a numeric value, and a stop key 405 for stopping a copying operation during continuous copying.

At the left side of the operation unit 180, a touch panel display 406 for displaying settings of various modes and a status of a printer is provided. At the right side of the operation unit 180, an interrupt key 407, a password key 408, a guidance key 409 are provided. The interrupt key 407 is pressed to interrupt an image formation operation during the operation for copying, the password key 408 is pressed to manage the number of sheets to be copied for individuals or sections, and the guidance key 409 is pressed to use a guidance function.

Below the key 409, a user mode key 410 is provided. The user mode key 410 is used to enter a user mode for users to manage the image forming apparatus 100 and perform setting such as specification of a calibration mode, registration of sheet information, and change of set time for entering a power-saving mode.

On the touch panel display 406, a full color image formation mode selection key 412, a monochromatic image formation mode selection key 413, and a color measurement mode selection key 414 are provided.

(Calibration Mode)

Figure 7:
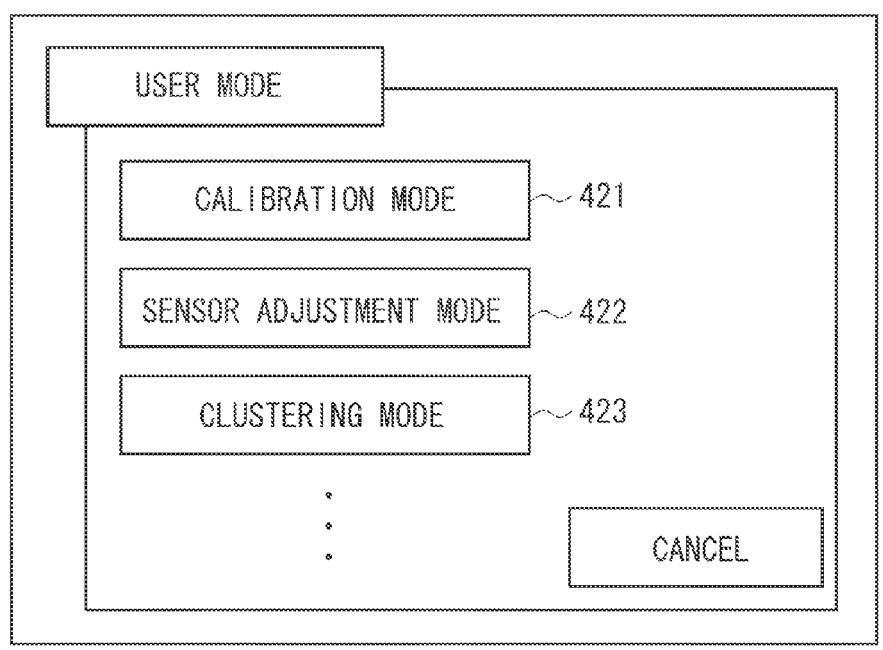
FIG. 7 illustrates a display screen to be displayed when a user mode key is selected.

A calibration mode according to the exemplary embodiment is described. On the operation unit 180 in FIG. 6, when a user selects the user mode key 410, the screen illustrated in FIG. 7 is displayed on the touch panel display 406. If the user selects the calibration mode key 421 on the screen, calibration for increasing stability in density and color of output images can be performed.

The term calibration in this description means the above-mentioned maximum density adjustment, gradation adjustment, and multicolor correction processing. When the user selects the calibration mode key 421, the calibration operation starts. Hereinafter, a series of the calibration processing is described with reference to a flowchart.

FIG. 8 is a flowchart illustrating an operation of the image forming apparatus 100. The flowchart is implemented by the printer controller 103. In step S801, the printer controller 103 determines whether an image formation request has been sent from the operation unit 180, and whether an image formation request has been sent from a host computer via the I/F 308.

If an image formation request has not been sent (NO in step S801), in step S802, the printer controller 103 determines whether a calibration instruction has been issued from the operation unit 180. The instruction of calibration is performed as described above by selecting the calibration mode key 421.

If a calibration instruction has been issued (YES in step S802), in step S803, the printer controller 103 performs the maximum density adjustment which will be described below with reference to FIG. 9, and in step S804, performs the gradation adjustment which will be described below with reference to FIG. 10. Then, in step S805, the printer controller 103 performs the multicolor correction processing which will be described below with reference to FIG. 11. In step S802, if a multicolor correction instruction has not been issued (NO in step S802), the processing returns to the above-described step S801. The maximum density adjustment and the gradation adjustment are performed before the multicolor correction processing is performed for the purpose of carrying out the multicolor correction processing with high accuracy.

In step S801, if the printer controller 103 determines that an image formation request has been issued (YES in step S801), in step S806, the printer controller 103 performs control to feed the sheet 110 from the storage 113, and in step S807, the printer controller 103 forms a toner image on the sheet 110. In step S808, the printer controller 103 determines whether the image formation has been performed on all pages. If the image formation has been performed on all pages (YES in step S808), the process returns to step S801. If the image formation has not been performed on all pages (NO in step S808), the process returns to step S806, and the image formation is performed on the next page.

FIG. 9 is a flowchart illustrating an operation of the maximum density adjustment. This flowchart is implemented by the printer controller 103.

In step S901, the printer controller 103 performs control to feed the sheet 110 from the storage 113. In step S902, the printer controller 103 issues, to the engine control unit 102, an instruction to form patch images onto the sheet 110. In step S903, when the sheet 110 arrives at the color sensor 200, the printer controller 103 controls the color sensor 200 to measure the patch images.

In step S904, the printer controller 103 causes the density conversion unit 324 to convert the spectral reflectance data output from the color sensor 200 into density data of CMYK. In step S905, the printer controller 103, based on the converted density data, calculates correction amounts of the charging potential, the exposure intensity, and the developing bias. The calculated correction amounts are stored in the storage unit 350, and used.

FIG. 10 is a flowchart illustrating an operation in the gradation adjustment. This flowchart is implemented by the printer controller 103.

In step S1001, the printer controller 103 performs control to feed the sheet 110 from the storage 113. In step S1002, the printer controller 103 issues, to the engine control unit 102, an instruction to form patch images (16 levels) for gradation adjustment on the sheet 110. In step S1003, when the sheet 110 arrives at the color sensor 200, the printer controller 103 controls the color sensor 200 to measure the patch images.

In step S1004, the printer controller 103 causes the density conversion unit 324 to convert the spectral reflectance data output from the color sensor 200 into density data of CMYK.

In step S1005, the printer controller 103, based on the converted density data, calculates a correction amount of the exposure intensity, and creates a LUT for correcting the gradation. The calculated LUT is set in the LUT unit 323, and used.

FIG. 11 is a flowchart illustrating an operation of the multicolor correction processing. This flowchart is implemented by the printer controller 103.

In step S1101, the printer controller 103 performs control to feed the sheet 110 from the storage 113. In step S1102, the printer controller 103 issues, to the engine control unit 102, an instruction to form patch images for the multicolor correction processing on the sheet 110. In step S1103, when the sheet 110 arrives at the color sensor 200, the printer controller 103 causes the color sensor 200 to measure the patch images.

In step S1104, the printer controller 103 causes the Lab calculation unit 303 to calculate color value data (L*a*b*) according to the spectral reflectance data output from the color sensor 200. Based on the color value data (L*a*b*), the printer controller 103 creates an ICC profile by the above-described processing. In step S1105, the printer controller 103 stores the ICC profile in the output ICC profile storage unit 305.

As described above, by performing a series of the calibration of the maximum density adjustment, gradation adjustment, and multicolor correction processing, the stability in the density, gradation, and tint of the images in the image forming apparatus 100 can be ensured, and thus high-accuracy color matching can be achieved.

(Color Measurement Mode)

Hereinafter, the color measurement mode is described. In the color measurement mode, a sheet having patch images formed in the image forming apparatus 100, or a sheet having patch images formed in an image forming apparatus other than the image forming apparatus 100 is measured by the color sensor 200.

For example, if the user wants to perform the color measurement again on an output product on which the above-described ICC profile creation processing, or the like has been performed, or if the user wants to measure accurate colors to use the product as a reference sample, colors can be measured with high accuracy and in a short time.

The measurement of the color of the sheet (chart) having the formed patch images is performed according to an instruction issued via the host computer or the operation unit 180. In the exemplary embodiment, a method of issuing a measurement instruction from the operation unit 180, and displaying a measurement result on the touch panel display 406 is described, however, other methods can be employed.

Figure 12A:
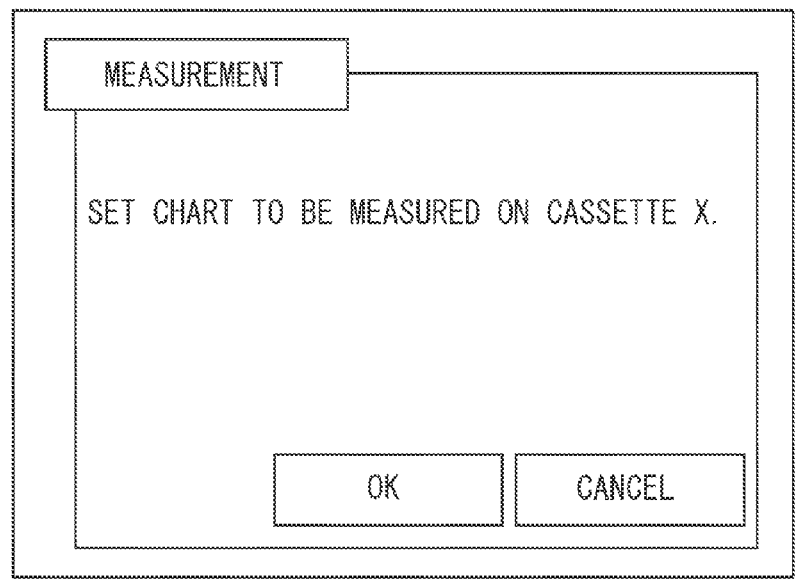
FIGS. 12A and 12B illustrate display screens to be displayed when a color measurement mode selection key is selected.

In a case where the color of the patch images on the chart is to be measured, the user selects the measurement mode selection key 414 on the operation unit 180 illustrated in FIG. 6. In response to the selection of the color measurement mode selection key 414, the screen illustrated in FIG. 12A is displayed. On the screen, a message "SET CHART TO BE MEASURED ON CASSETTE X." is displayed.

The user checks the screen in FIG. 12A, sets the chart to be measured in the cassette 124 such that the measurement surface faces downward, and selects the OK key. In response to the instruction, the color sensor 200 starts a color measurement operation of the chart. Hereinafter, the measurement mode is described in detail with reference to a flowchart.

FIG. 13 is a flowchart illustrating processing to be performed in the color measurement mode. This flowchart is executed by the printer controller 103 in response to the selection of the OK key on the screen illustrated in FIG. 12A.

Figure 12B:
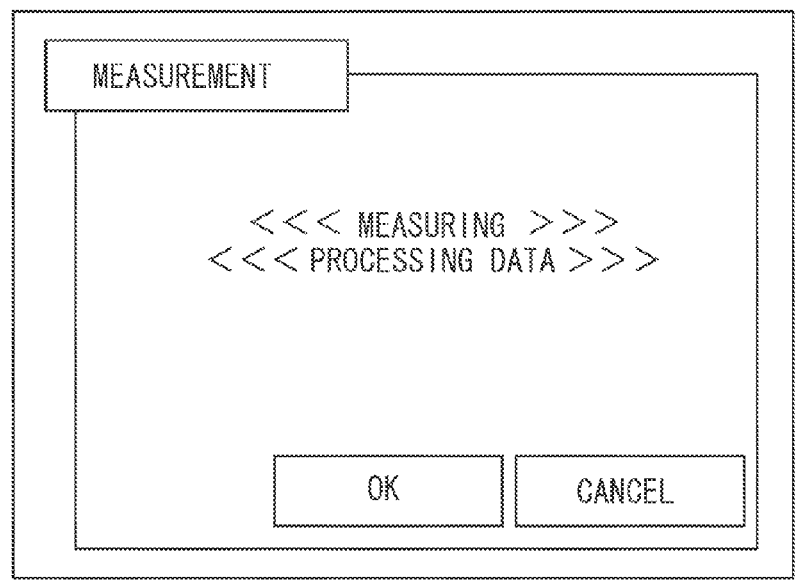

In step S1301, the printer controller 103 issues an instruction to the engine control unit 102 to start feeding a chart set in the cassette 124. In step S1302, the printer controller 103 waits until the chart arrives at the measurement position of the color sensor 200. When the chart arrives at the measurement position (YES in step S1302), in step S1303, the printer controller 103 causes the color sensor 200 to measure the chart. In this processing, the color sensor 200 outputs spectral reflectance data of the patch images on the chart. During the measurement operation by the color sensor 200, the screen illustrated in FIG. 12B indicating that the measurement is being performed is displayed.

In step S1304, the printer controller 103 causes the Lab calculation unit 303 to convert the spectral reflectance data output from the color sensor 200 into color value data (L*a*b*data). In step S305, the printer controller 103 causes the density conversion unit 324 to convert the spectral reflectance data output from the color sensor 200 into density data.

In step S1306, the printer controller 103, based on the calculated color value data and the density data, displays the screen illustrated in FIG. 14 on the touch panel display 406 of the operation unit 180. On the screen illustrated in FIG. 14, for each of patch images on the chart, color values (L, a, b) and density (D_C, D_M, D_Y, and D_K) are displayed.

The measured color value data and the density data can be transferred to the host computer or stored in an external memory. Then, in step S 1307, the printer controller 103 issues an instruction to the engine control unit 102 to output the chart out of the image forming apparatus 100, and ends the processing according to this chart.

(Sensor Adjustment Mode)

Hereinafter, a mode (sensor adjustment mode) for adjusting an output value of the color sensor 200 using the color sensor 200 is described.

In the sensor adjustment mode, an output value of the color sensor 200 is adjusted. For example, the sensor adjustment mode is used at the initial installation of the image forming apparatus 100 or in replacing the color sensor 200.

In the sensor adjustment mode, at the time of installation of the color sensor 200 under an actual measurement environment, an input signal and an output signal of the color sensor 200 are associated with each other. Then, the color sensor 200 is adjusted such that the same output signal is output as input signal irrespective of variations in the sensitivity of the color sensor 200, errors in the installing the color sensor 200 to the apparatus, or component tolerances. By the adjustment, high-accuracy color matching and color correction processing can be performed. In other words, in the sensor adjustment mode, a correction coefficient for converting the input signal value L*a*b* into the output signal value L*'a*'b' is calculated.

In the sensor adjustment mode, a reference chart of known color value data (L*a*b* data) is read by the color sensor 200, and the correction is performed using the input and output values. The reference chart is, for example, output using a printer. The color value data of the reference chart is measured with a commercial measurement device in advance and stored in the storage unit 350. The measurement result is input via the host computer, the operation unit 180, or an external memory into the controller such that the association can be made with the result of the reading by the color sensor 200 in the image forming apparatus 100.

On the operation unit 180 in FIG. 6, when the user selects the user mode key 410, a screen like the screen illustrated in FIG. 7 is displayed on the touch panel display 406. In response to selection of the sensor adjustment mode key 422 in the screen, the adjustment of the color sensor 200 is performed. Hereinafter, the sensor adjustment mode is described in detail with reference to a flowchart.

FIG. 15 is a flowchart illustrating processing to be performed in the sensor adjustment mode. This flowchart is executed by the printer controller 103 in response to the selection of the sensor adjustment mode key 422 on the screen illustrated in FIG. 7.

Figure 16A:
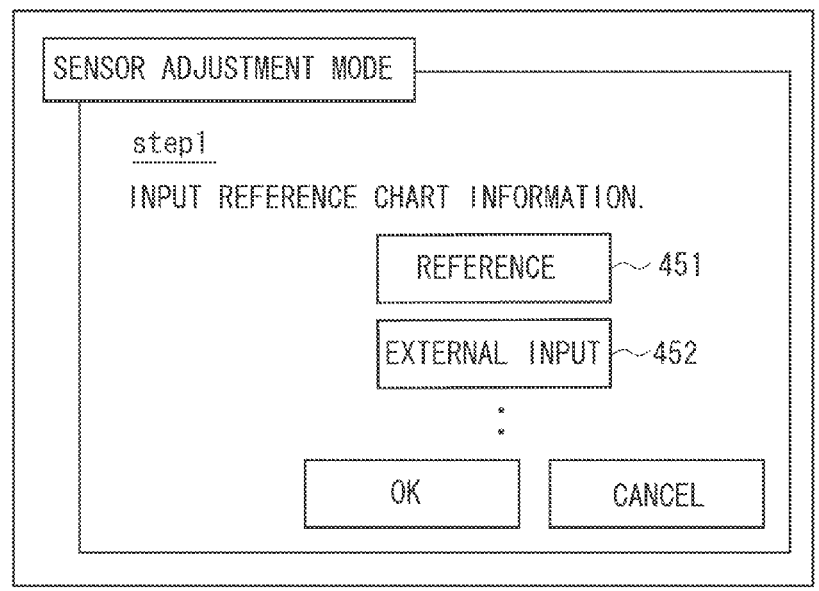
FIGS. 16A and 16B illustrate display screens to be displayed when a sensor adjustment mode key is selected.

In step S1501, in response to the selection of the sensor adjustment mode key 422, the printer controller 103 displays the input screen illustrated in FIG. 16A on the touch panel display 406. In step S1502, the printer controller 103 waits for an input of the color value data of the reference chart.

The input method of the color value data of the reference chart includes, (1) a method of registering color value data measured by an external measurement device in the storage unit 350 in advance, and referring to the registered color value data, and (2) a method of inputting color value data from an external memory, or the like via an I/F.

Figure 16B:
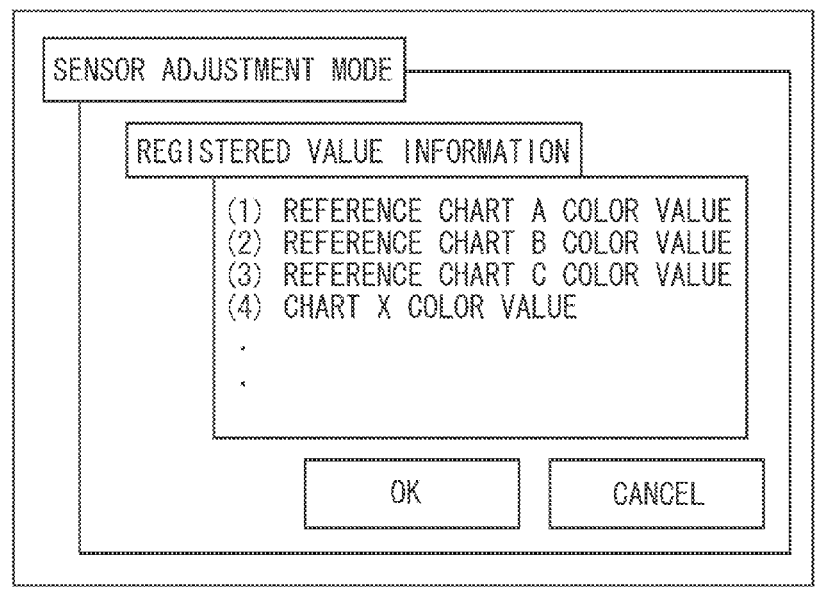

In response to selection of the reference key 451 in FIG. 16A, the screen illustrated in FIG. 16B is displayed. Each of color values in the charts displayed in the drawing is measured in advance, and registered in the storage unit 350. For example, if "REFERENCE CHART A COLOR VALUE" is selected, the printer controller 103 refers to the storage unit 350, and completes the input of the color values. If the external input key 452 in FIG. 16A is selected, color values of a reference chart can be input from an external memory, or the like.

Figure 17A:
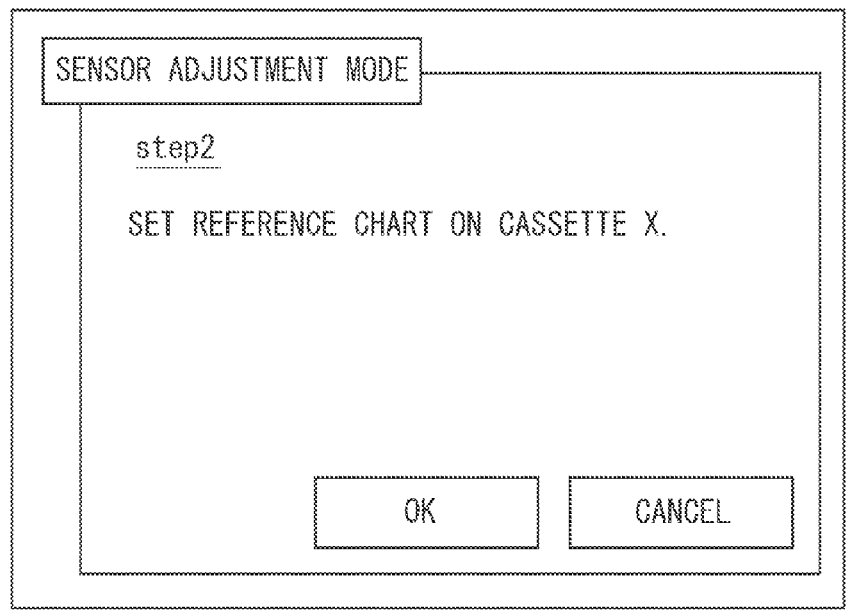
FIGS. 17A and 17B illustrate display screens to be displayed in the sensor adjustment mode.

When the input of the color values of the reference chart (YES in step S1502) is completed, in step S1503, the printer controller 103 displays the screen illustrated in FIG. 17A on the touch panel display 406 to urge the user to set the reference chart in the cassette 124. In step S1504, the printer controller 103 waits until the reference chart is set in the cassette 124.

Figure 17B:
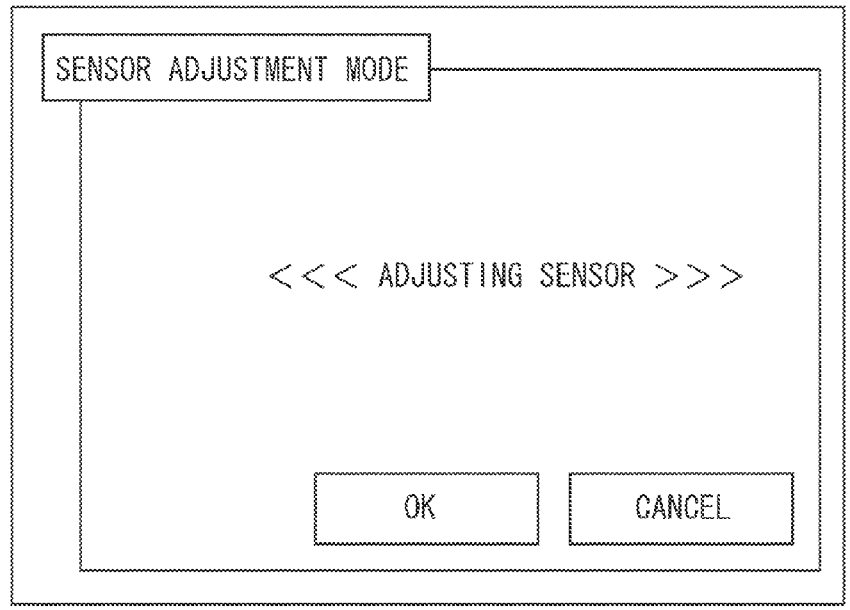

When the user sets the reference chart in the cassette 124 and presses the OK key on the screen in FIG. 17A (YES in step S1504), the printer controller 103 displays the screen of "ADJUSTING SENSOR" illustrated in FIG. 17B. In step S1505, the printer controller 103 issues, to the engine control unit 102, an instruction to feed the reference chart. In step S1506, the printer controller 103 waits until the reference chart arrives at the measurement position of the cassette 200.

When the reference chart arrives at the measurement position (YES in step S1506), in step S1507, the printer controller 103 controls the color sensor 200 to measure the reference chart. In this processing, the color sensor 200 outputs spectral reflectance data of the patch images on the chart.

In step S1508, the printer controller 103 causes the Lab calculation unit 303 to convert the spectral reflectance data output from the color sensor 200 into color value data (L*a*b* data). In step S1509, the printer controller 103 calculates a correction coefficient for converting the calculated color value data (L*a*b* data) into color value data (L*'a*'b' data) in the reference chart input in step S1502.

Then, in step S 1510, the printer controller 103 issues an instruction to the engine control unit 102 to discharge the reference chart out of the image forming apparatus 100, and ends the processing according to this chart.

The correction coefficient calculated in step S1509 is sent to the profile creation unit 301, and reconfiguration of the output ICC profile is performed using the correction coefficient. The reconfigured output ICC profile is stored in the output ICC profile storage unit 305. By using the output ICC profile, the printer controller 103 performs the color conversion processing to form an image in the normal image formation mode.

(Correction Coefficient Calculation Method)

A method of calculating the correction coefficient in step S1509 in FIG. 15 is described. In this exemplary embodiment, a direct mapping table is used as the correction coefficient for converting the L*a*b* data of the reference chart color-measured by the color sensor 200 into the L*'a*'b' data of the reference chart measured by the external measurement device.

For the reference chart, a chart suitable for the direct mapping is used. In the reference chart, the Lab color space area is divided into grid points at substantially the same grid point intervals. In this exemplary embodiment, the number of the grid points is 216, and the grid points are evenly arranged in the color space area. The number of the grid points in the reference chart is not limited to the above number, the number can be appropriately increased or reduced depending on the performance of the printer, and the like.

The printer controller 103 associates the L*a*b* data with the corresponding L*'a*'b' data, for the 216 colors, and thereby creates a direct mapping table like that illustrated in FIG. 18. In this exemplary embodiment, for the value between the grid points, a linearly interpolated value is used. In this exemplary embodiment, the direct mapping table has been created. Alternatively, a conversion matrix etc. can be used for the correction.

As described above, according to the first exemplary embodiment, the above-described sensor adjustment mode is employed. Consequently, variations in the measurement values of the sensors 200a to 200d in the image forming apparatus 100 can be reduced, and the convenience can be increased and the stability in the tint of output products can also be increased.

In the second exemplary embodiment, the color sensor 200 described in the first exemplary embodiment is used and a method (hereinafter, referred to as clustering) of matching the tint with that of another image forming apparatus is described. The configuration of the image forming apparatus 100 is similar to that in the first exemplary embodiment, and consequently, its description is omitted. In this exemplary embodiment, the clustering mode is described, however, it is to be understood that the clustering mode can be used together with the mode described in the first exemplary embodiment.

(Clustering Mode)

The clustering mode described in this exemplary embodiment is effective in matching tint with that of another image forming apparatus. In this exemplary embodiment, a method of correcting tint of image forming apparatuses having two different color spaces will be described, however, the exemplary embodiment is not limited to this method. The correction can also be made by performing similar operation in many more apparatuses, or in a case where different types of sheets are output.

As an example, a clustering mode employed in image forming apparatuses (hereinafter, referred to as an apparatus A and an apparatus B) rendering two types of different color spaces is described. As described in the first exemplary embodiment, an image signal is input from a host computer or an external memory via the I/F 308. An input RGB signal value or a standard print CMYK signal value such as Japan Color is sent to the input ICC profile storage unit 307 for external input.

As described with reference to FIG. 3, in the input ICC profile storage unit 307, depending on the input image signal, a conversion from RGB to Lab or a conversion from CMYK to Lab is performed. The image signal converted into Lab coordinates is input into the CMM 306, and processes such as GAMUT conversion for mapping mismatch between the read color space and the output color reproduction range, and other are performed.

The L*a*b* data is converted into L*'a*'b' data, and the data is input into the output ICC profile storage unit 305. The input L*'a*'b' data is subjected to color conversion using the ICC profile, converted into a CMYK signal that depends on the output device, and the signal is output.

The CMYK signal value is input into the engine control unit 102, and based on the CMYK signal value, image formation is performed. Through the processing, the image data is output in the normal image formation mode.

The apparatus A and the apparatus B may have different output color reproduction ranges, for example, the apparatus A has a range narrower than the color reproduction range of Japan Color, and the apparatus B has a range wider than the range of Japan Color. In such a case, the tint of the output products is different even if the same signal value is input. The clustering mode is a mode for correcting the tint of the apparatus A and the apparatus B. A method for adjusting the tint of the apparatus B to the tint of the apparatus A by using the apparatus A as the reference is described below.

(Clustering Mode)

An instruction of the clustering mode in the apparatus B can be issued from the operation unit 180.

On the operation unit 180 in FIG. 6, when the user selects the user mode key 410, a screen illustrated in FIG. 7 is displayed on the touch panel display 406. In response to selection of the clustering mode key 423 in the screen, clustering between the apparatus A and the apparatus B is performed. Hereinafter, the clustering mode is described in detail with reference to a flowchart.

Figure 19:
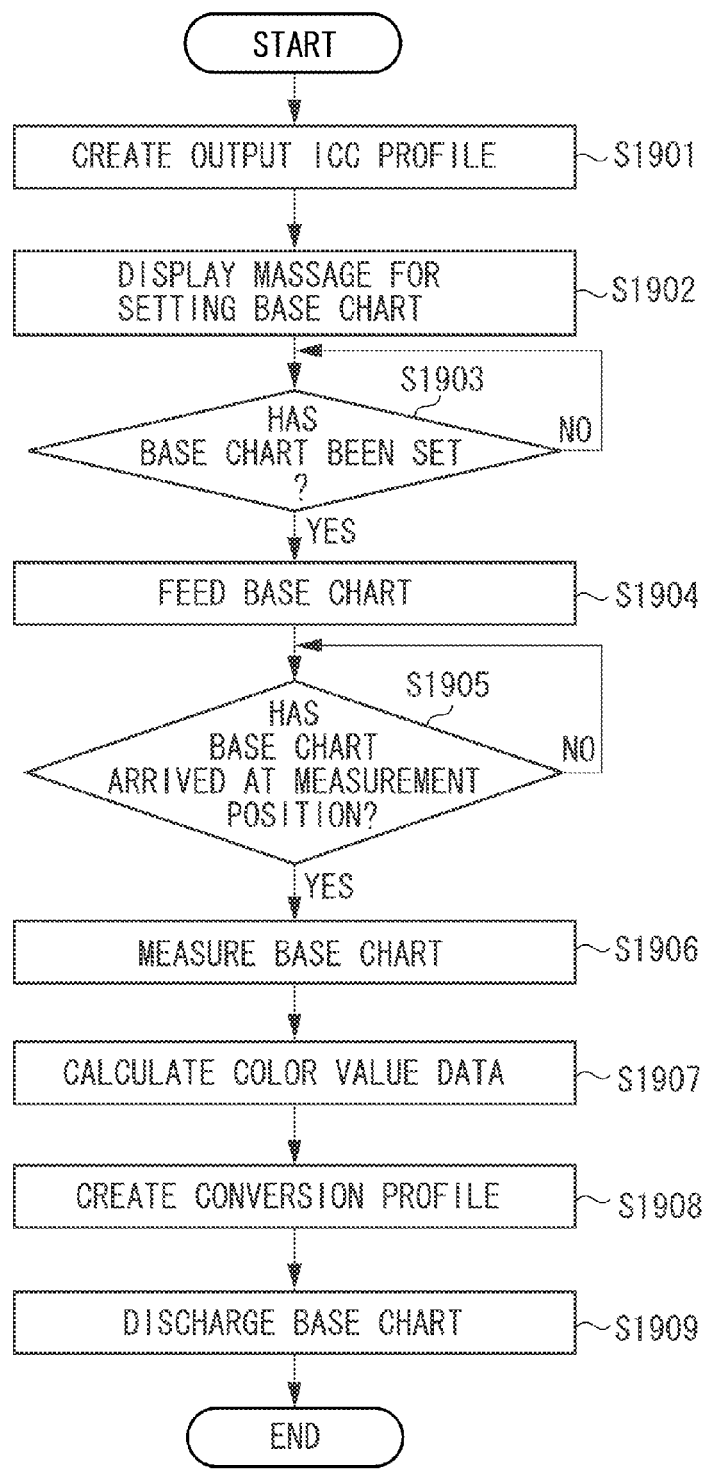
FIG. 19 is a flowchart illustrating processing to be performed in a clustering mode.

FIG. 19 is a flowchart illustrating processing to be performed in the clustering mode. This flowchart is executed by the printer controller 103 in the apparatus B in response to the selection of the clustering mode key 423 on the screen illustrated in FIG. 7.

In step S1901, the printer controller 103 creates an output ICC profile in the apparatus B. The creation method of the output ICC profile is similar to that in the first exemplary embodiment, and consequently, its description is omitted.

Figure 20A:
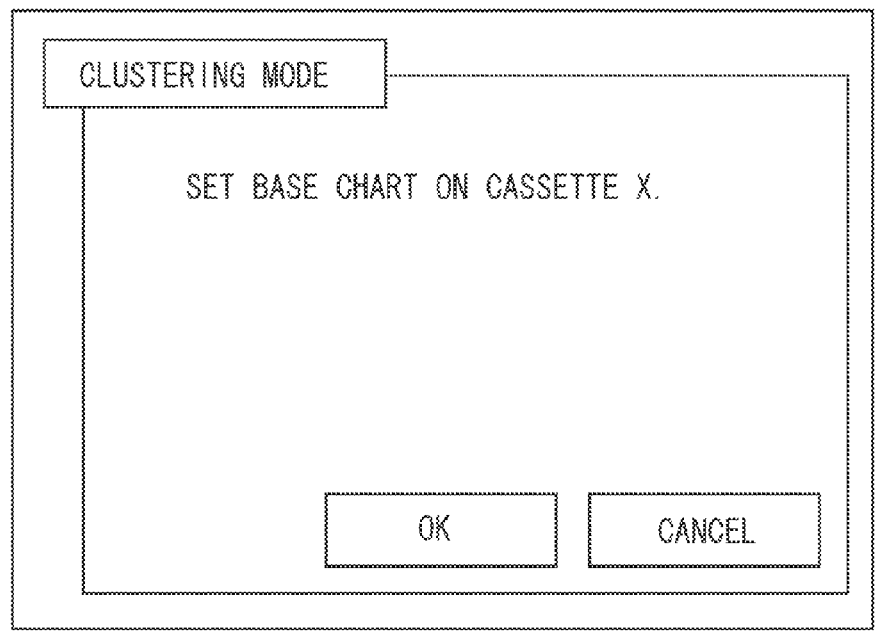
FIGS. 20A and 20B illustrate display screens to be displayed in the clustering mode.

In step S1902, when the output ICC profile is created in the apparatus B, the printer controller 103 displays the screen illustrated in FIG. 20A on the touch panel display 406. The display urges the user to set a chart serving as a base (hereinafter, referred to as a base chart) in the cassette 124. In step S1903, the printer controller 103 waits until the base chart is set in the cassette 124.

In this exemplary embodiment, to match the tint with that of the apparatus A, a base chart output from the apparatus A is used. An instruction for outputting the base chart is issued via a host computer or the operation unit 180. The apparatus A outputs the base chart without using a profile created for the apparatus A, so that the chart reflecting the engine characteristics of the apparatus A can be created.

Figure 20B:
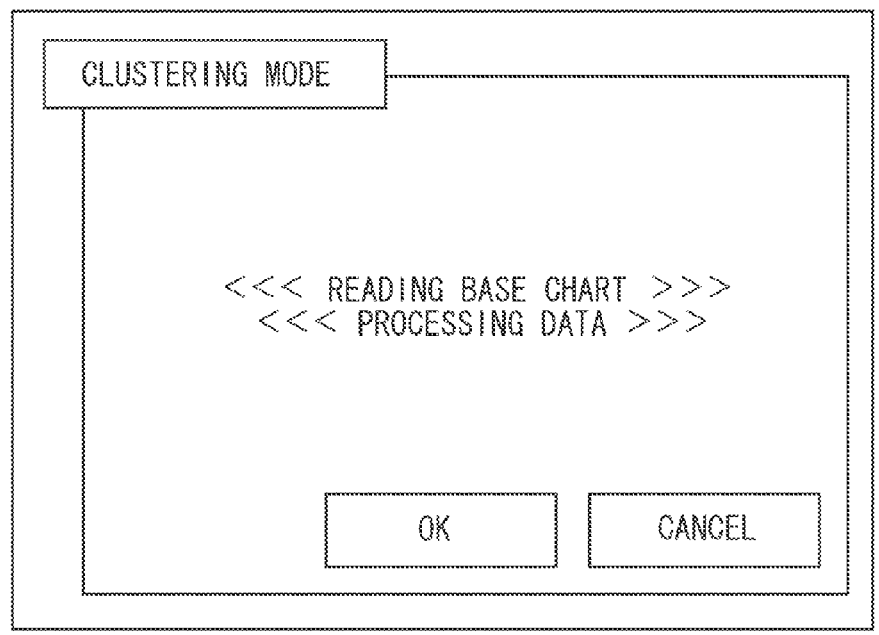

When the user sets the base chart in the cassette 124 and presses the OK key on the screen illustrated in FIG. 20A, the printer controller 103 displays the screen of "READING BASE CHART" illustrated in FIG. 20B (YES in step S1903). In step S1904, the printer controller 103 issues, to the engine control unit 102, an instruction to feed the base chart. In step S1905, the printer controller 103 waits until the base chart arrives at the measurement position of the cassette 200.

When the chart arrives at the measurement position (YES in step S1905), In step S1906, the printer controller 103 controls the color sensor 200 to measure the base chart. At this time, the color sensor 200 outputs spectral reflectance data of the patch images on the base chart.

In step S1907, the printer controller 103 causes the Lab calculation unit 303 to convert the spectral reflectance data output from the color sensor 200 into color value data (L*a*b* data). Since the base chart is created based on CMYK input signal information, in step S1908, the printer controller 103 creates a profile for conversion from Lab to CMYK and conversion from CMYK to Lab.

In step S1909, the printer controller 103 issues an instruction, to the engine control unit 102, to discharge the base chart out of the image forming apparatus 100, and ends the processing according to this chart.

The execution of the clustering mode enables the apparatus A to output an image with the tint matching with that of the apparatus B in a case where a normal image is formed in the apparatus A. Hereinafter, the color conversion processing is described.

In the normal image formation in the apparatus A, an RGB or CMYK signal value input via the I/F 308 from the host computer, or the like is converted into L*a*b* data with the profile stored in the input ICC profile storage unit 307. The L*a*b* data depends on the color reproduction range that can be reproduced by the apparatus A.

Next, the CMM 306 converts the input L*a*b* data into a CMYK signal value in the color space of the apparatus B based on the conversion formula from L*a*b* to CMYK calculated in step S1908, and after that converts the signal value into L*a*b* data based on the formula converting from CMYK to Lab. Through the processing, the data is converted into the color value within the color reproduction range of the apparatus B.

In addition, the CMM 306 performs GAMUT conversion, or the like to convert the L*'a*'b' data into L"*a"*b"* data, and inputs the data into the output ICC profile storage unit 305. With the output ICC profile, the Lab input value is converted into the CMYK signal depending on the engine characteristics of the apparatus A, the converted CMYK signal value is sent to the printer unit 1201, and image formation is performed.

As described above, in the second exemplary embodiment, the above-described clustering mode is provided. Consequently, variations in the measurement values of the sensors 200 in the two types of the image forming apparatuses rendering the different reproducible color spaces can be reduced, and the convenience can be increased. Further, the stability in the tint of output products can also be increased.

Hereinafter, the third exemplary embodiment is described. In the first and second exemplary embodiments, a chart set in the cassette 124 is to be fed. Alternatively, a chart set in the storage 113 can also be fed. In such a case, the engine control unit 102 controls the conveyance of the chart such that the chart is fed from the storage 113, passes through the first fixing device 150, and passes through the conveyance path 130 without passing through the second fixing device 160.

FIG. 21 is a flowchart illustrating processing to be performed according to the third exemplary embodiment. This flowchart is performed by the printer controller 103.

In step S2101, in a state where power supply to the first fixing device 150 is stopped, the printer controller 103 waits until a temperature of the first fixing device 150 falls below a predetermined temperature (60° C. or lower) based on an output from a thermistor in the first fixing device 150. In this exemplary embodiment, a toner having the softening point temperature of 73.9° C. is used, and consequently, the predetermined temperature is set to 60° C. If the temperature is 60° C. or lower from the start (YES in step S2101), the process proceeds to the next step in the state where power supply to the first fixing device 150 is stopped without waiting in step S2101.

The temperature of the first fixing device 150 in the multicolor correction mode illustrated in FIG. 11 is set at 150° C. Consequently, the temperature (60° C.) of the first fixing device 150 in the chart measurement mode according to the exemplary embodiment is set to the temperature lower than the temperature (150° C.) of the first fixing device 150 in the multicolor correction mode in FIG. 11.

In the state where temperature of the first fixing device is 60° C. or lower, the printer controller 103 issues an instruction to the engine control unit 102 to start feeding of the chart set in the storage 113. In step S2103, based on the instruction from the printer controller 103, the engine control unit 102 conveys the chart to pass through the fixing device 150.

At this step, the temperature of the first fixing device decreases to a temperature lower than 60° C., and consequently, even if the chart passes through the first fixing device 150, the device 150 has little influence on the color value and density value of the chart. The pressure of the first fixing device 150 is set to a pressure enough to nip and convey the chart, and the pressure can be much lower than that in the normal image formation mode. The pressure can be changed by moving one of rollers for conveying a pressure belt 152 using a cam mechanism in a direction separating from the fixing roller 151. The chart passes through the fixing device 150, and subsequently passes through a conveyance path detouring around the second fixing device 160.

In step S2104, the printer controller 103 waits until the chart arrives at the measurement position of the cassette 200. When the chart arrives at the measurement position (YES in step S2104), in step S2105, the printer controller 103 controls the color sensor 200 to measure the chart. At this time, the color sensor 200 outputs spectral reflectance data of the patch images on the chart.

In step S2106, the printer controller 103, by using the Lab calculation unit 303, converts the spectral reflectance data output from the color sensor 200 into color value data (L*a*b* data). Further, in step S2107, the printer controller 103, by using the density conversion unit 324, converts the spectral reflectance data output from the color sensor 200 into density data.

In step S2108, the printer controller 103, based on the calculated color value data and the density data, displays the screen illustrated in FIG. 14 on the touch panel display 406 of the operation unit 180. On the screen illustrated in FIG. 14, for each of patch images on the chart, color values (L, a, b) and density (D_C, D_M, D_Y, and D_K) are displayed.

The measured color value data and the density data can be transferred to the host computer or stored in an external memory. Then, in step S2109, the printer controller 103 discharges the chart out of the image forming apparatus 100, and ends the processing according to this chart.

As described above, according to the third exemplary embodiment, in measuring the chart with the color sensor 200, change in the color of the patch images due to the heat from the fixing device can be prevented, and consequently, the stability in the tint of output products can be increased.

Further, according to the third exemplary embodiment, it is not necessary to provide a dedicated storage for storing the chart, and a dedicated conveyance path. This prevents the size of the apparatus from increasing, and the structure from getting complex.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-244531 filed Nov. 6, 2012 and No. 2012-245506 filed Nov. 7, 2012, each of which is hereby incorporated by reference herein in their entirety.

What is claimed is:

1. An image forming apparatus comprising:
    an image forming unit configured to form a measurement image on a sheet;
    a measurement unit configured to emit light to the measurement image, and measure light reflected from the measurement image;
    a selection unit configured to select one of a first mode for feeding a sheet, forming a measurement image on the sheet with the image forming unit, and measuring the measurement image on the sheet with the measurement unit, and a second mode for feeding a chart on which a measurement image has already been formed, and measuring the measurement image on the chart with the measurement unit without performing image formation with the image forming unit; and
    a control unit configured to control the measurement unit to perform measurement of the measurement image according to the mode selected by the selection unit,
    wherein a conveyance path of the sheet in the first mode is different from a conveyance path of the chart in the second mode.

2. The image forming apparatus according to claim 1, further comprising:
    a fixing unit configured to heat and fix the measurement image formed on the sheet by the image forming unit,
    wherein the conveyance path of the sheet in the first mode is a conveyance path passing through the fixing unit, and the conveyance path of the chart in the second mode is a conveyance path which does not pass through the fixing unit.

3. The image forming apparatus according to claim 1, further comprising:
    a display unit configured to display a measurement value of the measurement unit in the second mode.

4. The image forming apparatus according to claim 1, further comprising:
    an input unit configured to externally input a measurement value of a measurement image on a chart serving as a reference,
    wherein the control unit, in the second mode, calculates a correction coefficient for correcting a measurement value of the measurement unit based on a measurement value of the measurement image measured by the measurement unit, and the measurement value input by the input unit.

5. The image forming apparatus according to claim 1, further comprising:
    a storage unit configured to store a measurement value of a measurement image on a chart serving as a reference,
    wherein the control unit, in the second mode, calculates a correction coefficient for correcting a measurement value of the measurement unit based on a measurement value of the measurement image measured by the measurement unit, and the measurement value stored by the storage unit.

6. The image forming apparatus according to claim 1, wherein, in the second mode, to match a color of the image formed by the image forming unit with a color of an image formed by another image forming apparatus, the control unit controls the measurement unit to measure the measurement image on the sheet formed by the other image forming apparatus, and based on a measurement value, creates a profile for converting a measurement value of the measurement unit.

7. The image forming apparatus according to claim 1, wherein the measurement image formed by the image forming unit is a multicolor image formed by superimposing a plurality of color materials.

8. The image forming apparatus according to claim 1, wherein the image forming unit transfers a toner onto the sheet to form the image.

9. The image forming apparatus according to claim 1, wherein the image forming unit discharges ink onto the sheet to form the image.

10. An image forming apparatus comprising:
    an image forming unit configured to form a measurement image on a sheet;
    a fixing unit configured to heat and fix the measurement image formed on the sheet by the image forming unit;
    a measurement unit configured to emit light to a measurement image, and measure light amount reflected from the measurement image for each wavelength;
    a selection unit configured to select one of a first mode for forming a measurement image on the sheet with the image forming unit, conveying the sheet to pass through the fixing unit, and measuring the measurement image on the sheet with the measurement unit, and a second mode for feeding a sheet on which a measurement image has already been formed, conveying the sheet to pass through the fixing unit without performing image formation with the image forming unit, and measuring the measurement image on the sheet with the measurement unit; and
    a control unit configured to reduce a temperature of the fixing unit if the second mode has been selected, to be lower than a temperature if the first mode has been selected by the selection unit, and to measure the measurement image on the sheet with the measurement unit.

11. The image forming apparatus according to claim 10, wherein a conveyance path of the sheet in the first mode is the same as a conveyance path of the sheet in the second mode.

12. The image forming apparatus according to claim 10, wherein the fixing unit includes a first fixing device and a second fixing device provided at a downstream side of the first fixing device in a sheet conveyance direction, and
    the control unit, in the second mode, conveys the sheet having the measurement image formed thereon to pass through the first fixing device, guides the sheet to a conveyance path detouring around the second fixing device, and measures the measurement image with the measurement unit.

13. The image forming apparatus according to claim 10, further comprising:
    a display unit configured to display a measurement value of the measurement unit in the second mode.

14. The image forming apparatus according to claim 10, further comprising:
    a temperature measurement unit configured to measure a temperature of the fixing unit,
    wherein if the second mode is selected by the selection unit, the image formation unit waits until the temperature of the fixing unit decreases to a predetermined temperature or lower, and measures the measurement image with the measurement unit.

15. The image forming apparatus according to claim 14, wherein the image forming unit forms the measurement image on the sheet with a toner, and
the predetermined temperature is set at a temperature lower than a softening point temperature of the toner.

16. The image forming apparatus according to claim 10, wherein the measurement image formed by the image forming unit is a multicolor image formed by superimposing a plurality of color materials.

17. The image forming apparatus according to claim 10, further comprising:
a first calculation unit configured to calculate a color value of the measurement image based on a measurement value of the measurement unit, and a second calculation unit configured to calculate a density of the measurement image based on the measurement value of the measurement unit.

18. The image forming apparatus according to claim 10, wherein the image forming unit transfers a toner onto the sheet to form the image.

19. The image forming apparatus according to claim 10, wherein the image forming unit discharges ink onto the sheet to form the image.

* * * * *